United States Patent
Price et al.

(10) Patent No.: US 11,569,695 B2
(45) Date of Patent: *Jan. 31, 2023

(54) WIRELESS POWER TRANSFER AND COMMUNICATIONS

(71) Applicant: SIGMASENSE, LLC., Wilmington, DE (US)

(72) Inventors: John Christopher Price, Austin, TX (US); Daniel Keith Van Ostrand, Leander, TX (US); Phuong Huynh, Fairfax, VA (US)

(73) Assignee: SIGMASENSE, LLC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/358,307

(22) Filed: Jun. 25, 2021

(65) Prior Publication Data

US 2021/0320537 A1 Oct. 14, 2021

Related U.S. Application Data

(63) Continuation of application No. 16/428,063, filed on May 31, 2019, now Pat. No. 11,056,930.

(51) Int. Cl.
*H02J 50/80* (2016.01)
*H02J 50/10* (2016.01)
(Continued)

(52) U.S. Cl.
CPC .............. *H02J 50/80* (2016.02); *H02J 50/10* (2016.02); *H02J 50/12* (2016.02); *H02J 50/40* (2016.02)

(58) Field of Classification Search
None
See application file for complete search history.

(56) References Cited

U.S. PATENT DOCUMENTS 6,133,712 A 10/2000 Yeon
6,218,972 B1 4/2001 Groshong
(Continued)

OTHER PUBLICATIONS

Baker; How delta-sigma ADCs work. Part 1; Analog Applications Journal; Oct. 1, 2011; 6 pgs.
(Continued)

*Primary Examiner* — Thomas J. Hiltunen
(74) *Attorney, Agent, or Firm* — Garlick & Markison; Timothy W. Markison; Shayne X. Short

(57) ABSTRACT

A device operative to transfer power and communicate wirelessly includes a drive-sense circuit (DSC), memory that stores operational instructions, and processing module (s). The DSC generates a drive signal based on a reference signal and provides the drive signal to a first coil via a single line and via a resonating capacitor, and simultaneously senses the drive signal via the single line, to facilitate electromagnetic coupling to a second coil to transfer power wirelessly to another device. The DSC also detects electrical characteristic(s) of the drive signal including whether a communication signal is transmitted from another device and generates a digital signal representative thereof. The processing module(s) generates the reference signal, processes the digital signal including to determine whether the communication signal is transmitted from the other device to the device and appropriately processes the digital signal to interpret control information of the communication signal to adapt the reference signal.

20 Claims, 24 Drawing Sheets

(51) Int. Cl.
  *H02J 50/12* (2016.01)
  *H02J 50/40* (2016.01)

(56) References Cited

U.S. PATENT DOCUMENTS

| | | | |
|---|---|---|---|
| 6,665,013 B1 | 12/2003 | Fossum et al. | |
| 6,828,853 B2* | 12/2004 | Rizzo | G06K 19/0723 |
| | | | 235/439 |
| 7,215,723 B2* | 5/2007 | Rizzo | G06K 7/0008 |
| | | | 329/347 |
| 7,528,755 B2 | 5/2009 | Hammerschmidt | |
| 7,847,627 B2* | 12/2010 | Kranabenter | G06K 7/0008 |
| | | | 329/347 |
| 8,031,094 B2 | 10/2011 | Hotelling | |
| 8,089,289 B1 | 1/2012 | Kremin et al. | |
| 8,279,180 B2 | 10/2012 | Hotelling et al. | |
| 8,547,114 B2 | 10/2013 | Kremin | |
| 8,625,726 B2 | 1/2014 | Kuan | |
| 9,106,269 B2* | 8/2015 | Moes | H04B 5/0025 |
| 9,201,547 B2 | 12/2015 | Elias | |
| 9,253,002 B2* | 2/2016 | Noguchi | H04L 25/0268 |
| 10,044,226 B2* | 8/2018 | Watanabe | H02J 50/80 |
| 10,056,944 B2 | 8/2018 | Tsai | |
| 10,312,748 B2 | 6/2019 | Tsai | |
| 10,686,334 B2 | 6/2020 | Inoue | |
| 10,756,578 B1* | 8/2020 | Price | H02J 7/025 |
| 11,056,930 B2* | 7/2021 | Price | H02J 50/12 |
| 2004/0130915 A1 | 7/2004 | Baarman | |
| 2009/0079270 A1 | 3/2009 | Jin | |
| 2011/0127954 A1 | 6/2011 | Walley | |
| 2013/0043951 A1 | 2/2013 | Irish | |
| 2013/0096651 A1 | 4/2013 | Ozawa | |
| 2013/0278447 A1 | 10/2013 | Kremin | |
| 2014/0197782 A1 | 7/2014 | Graf | |
| 2014/0203822 A1 | 7/2014 | Tsai | |
| 2014/0211516 A1 | 7/2014 | Kung et al. | |
| 2016/0049827 A1 | 2/2016 | Tilvis | |
| 2016/0188049 A1 | 6/2016 | Yang et al. | |
| 2016/0226293 A1* | 8/2016 | Chen | H04B 5/0031 |
| 2017/0242502 A1 | 8/2017 | Gray et al. | |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

International Searching Authority; International Search Report and Written Opinion; International Application No. PCT/US2020/034506/; dated Jul. 29, 2020; 12 pgs.

* cited by examiner communication system 10 computing device 12 computing device 14 computing device 18

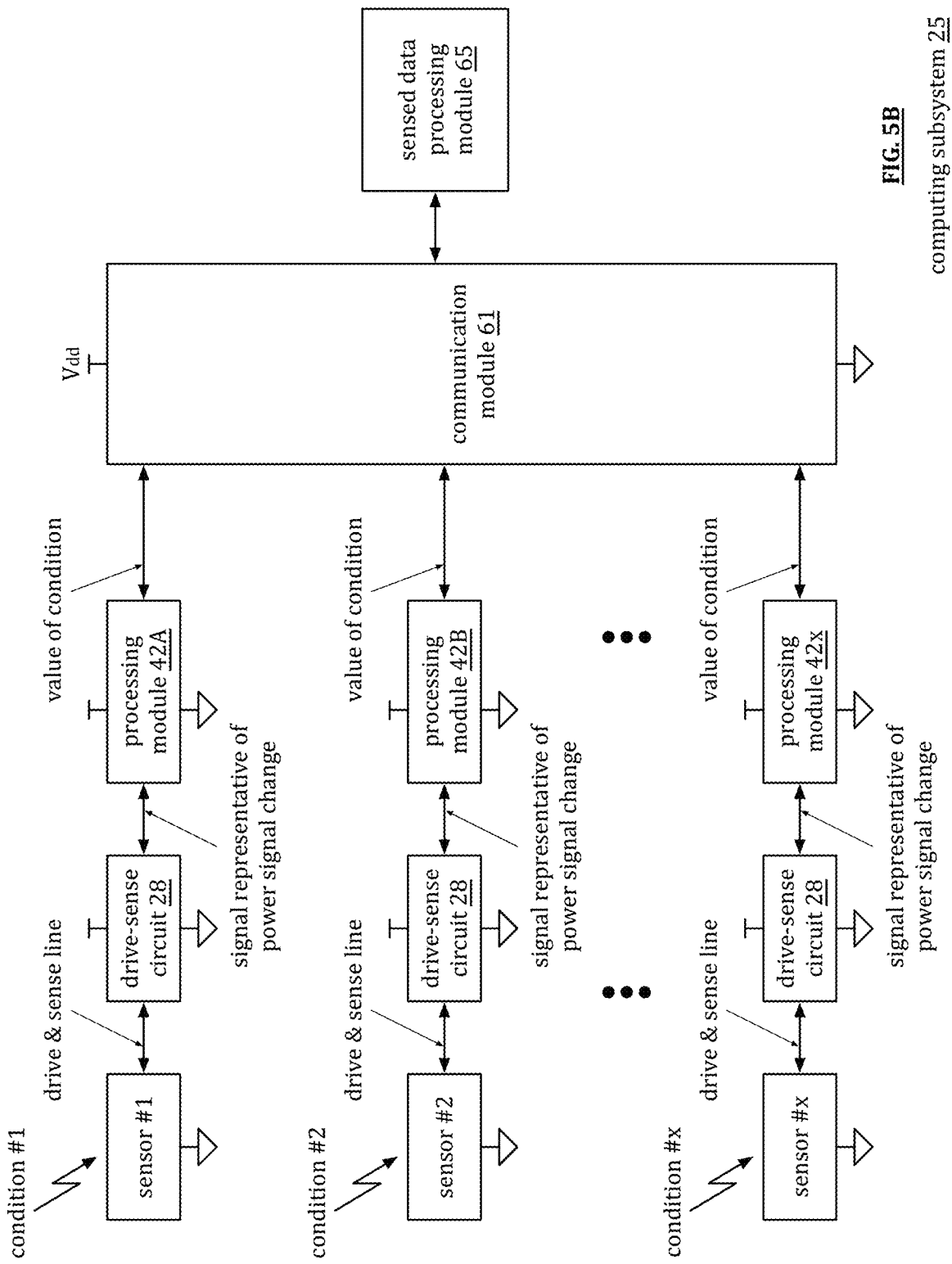

computing subsystem 25 sensor graph power signal graph power signal graph power signal graph power signal graph power signal graph

WIRELESS POWER TRANSFER AND COMMUNICATIONS

CROSS REFERENCE TO RELATED PATENTS

The present U.S. Utility Patent Applications claims priority pursuant to 35 U.S.C. § 120 as a continuation of U.S. Utility application Ser. No. 16/428,063, entitled "Wireless Power Transfer and Communications," filed May 31, 2019, pending and scheduled to issue as U.S. Pat. No. 11,056,930 on Jul. 6, 2021, which is hereby incorporated herein by reference in its entirety and made part of the present U.S. Utility Patent Applications for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to wireless power transfer and data communication systems and more particularly to wireless power transfer, sensed data collection, and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touch screen. As yet another example, the computing device processes the sensor signals to determine various data points in a production line of a product.

BRIEF DESCRIPTION OF THE SEVERAL VIEWS OF THE DRAWING(S)

FIG. 5B is a schematic block diagram of another embodiment of a computing subsystem in accordance with the present invention;

Figure 24:
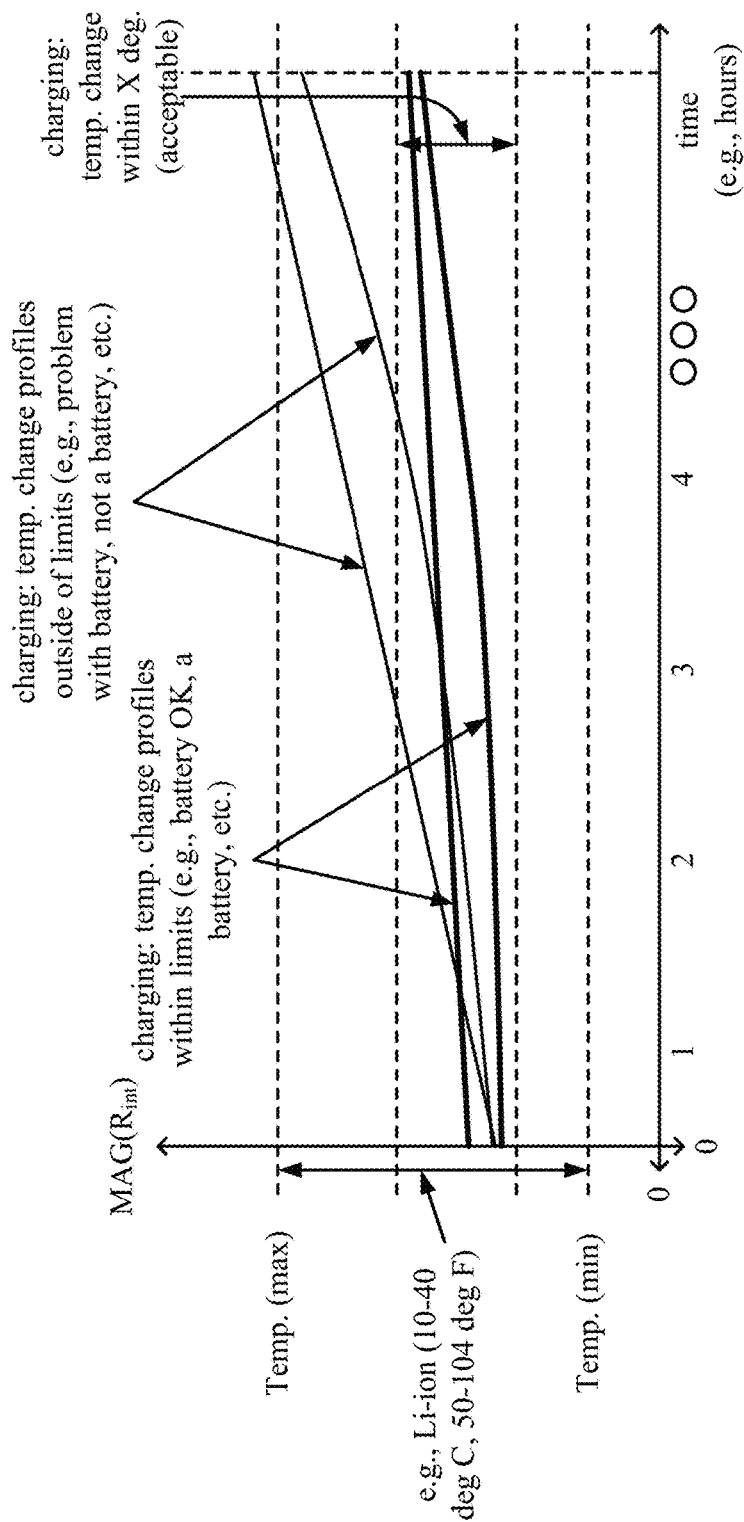
Figure 25:
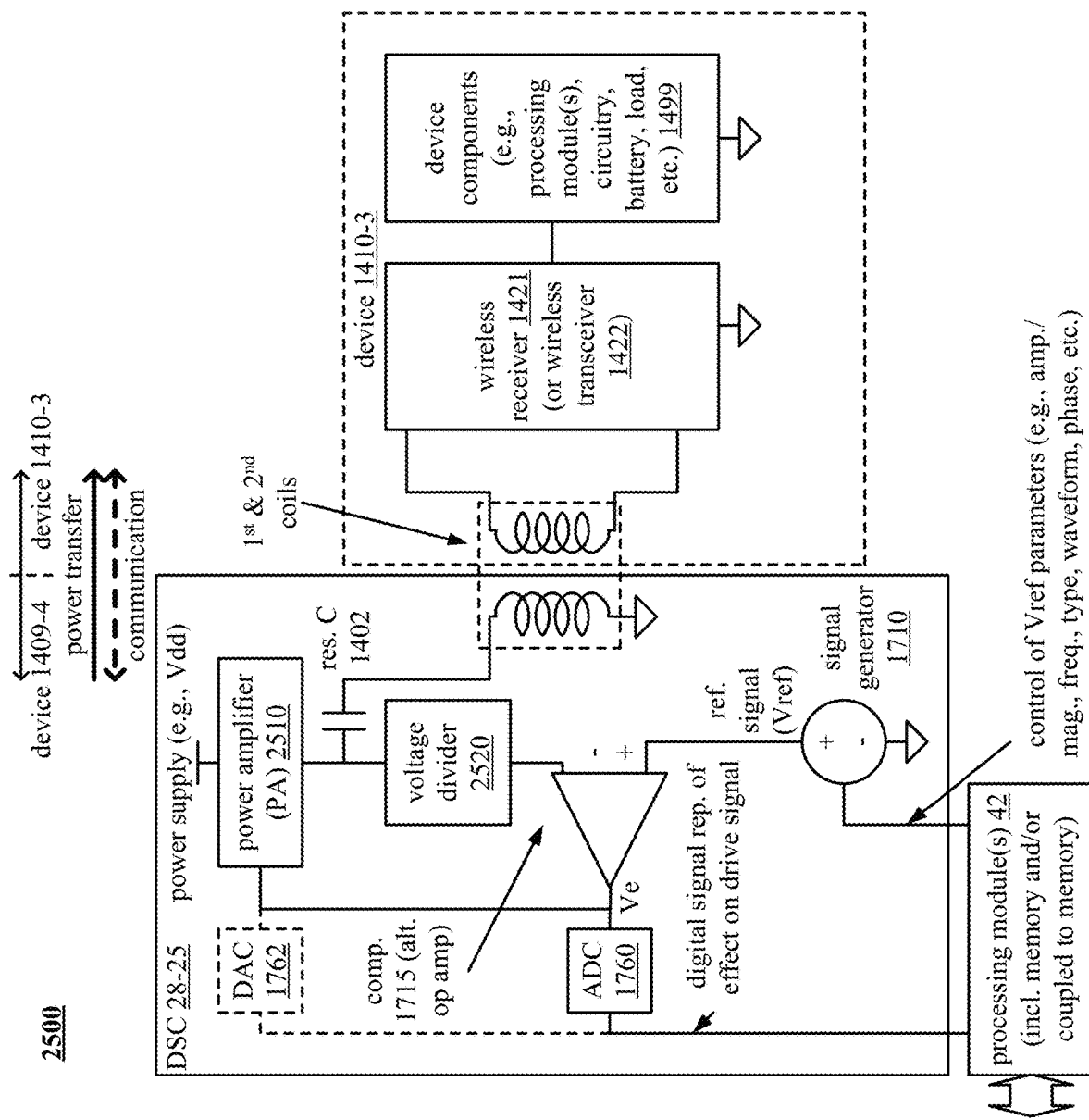

FIG. 24 is a schematic block diagram of an embodiment of a battery temperature profile such as associated with a battery of a device during battery charging in accordance with wireless transfer of power in accordance with the present invention; and FIG. 25 is a schematic block diagram of another embodiment of various devices including a device that is operative to transfer power and communicate wirelessly in accordance with the present invention.

DETAILED DESCRIPTION OF THE INVENTION

Figure 1:
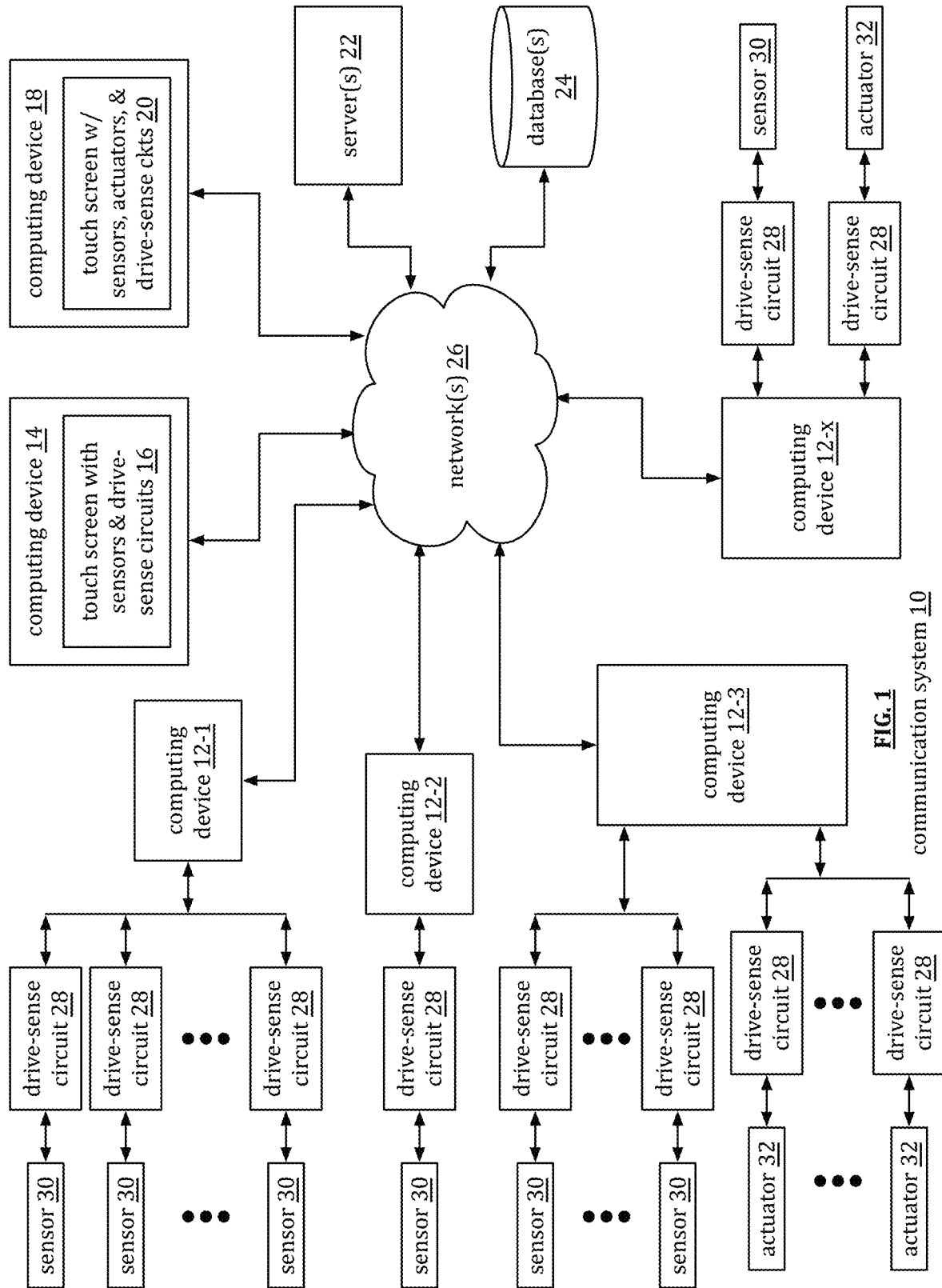
FIG. 1 is a schematic block diagram of an embodiment of a communication system in accordance with the present invention.

FIG. 1 is a schematic block diagram of an embodiment of a communication system 10 that includes a plurality of computing. devices 12-10, one or more servers 22, one or more databases 24, one or more networks 26, a plurality of drive-sense circuits 28, a plurality of sensors 30, and a plurality of actuators 32. Computing devices 14 include a touch screen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a standalone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-x is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-x. For example, the sensor 30 may be a piezoelectric microphone and the actuator 32 may be a piezoelectric speaker.

Figure 2:
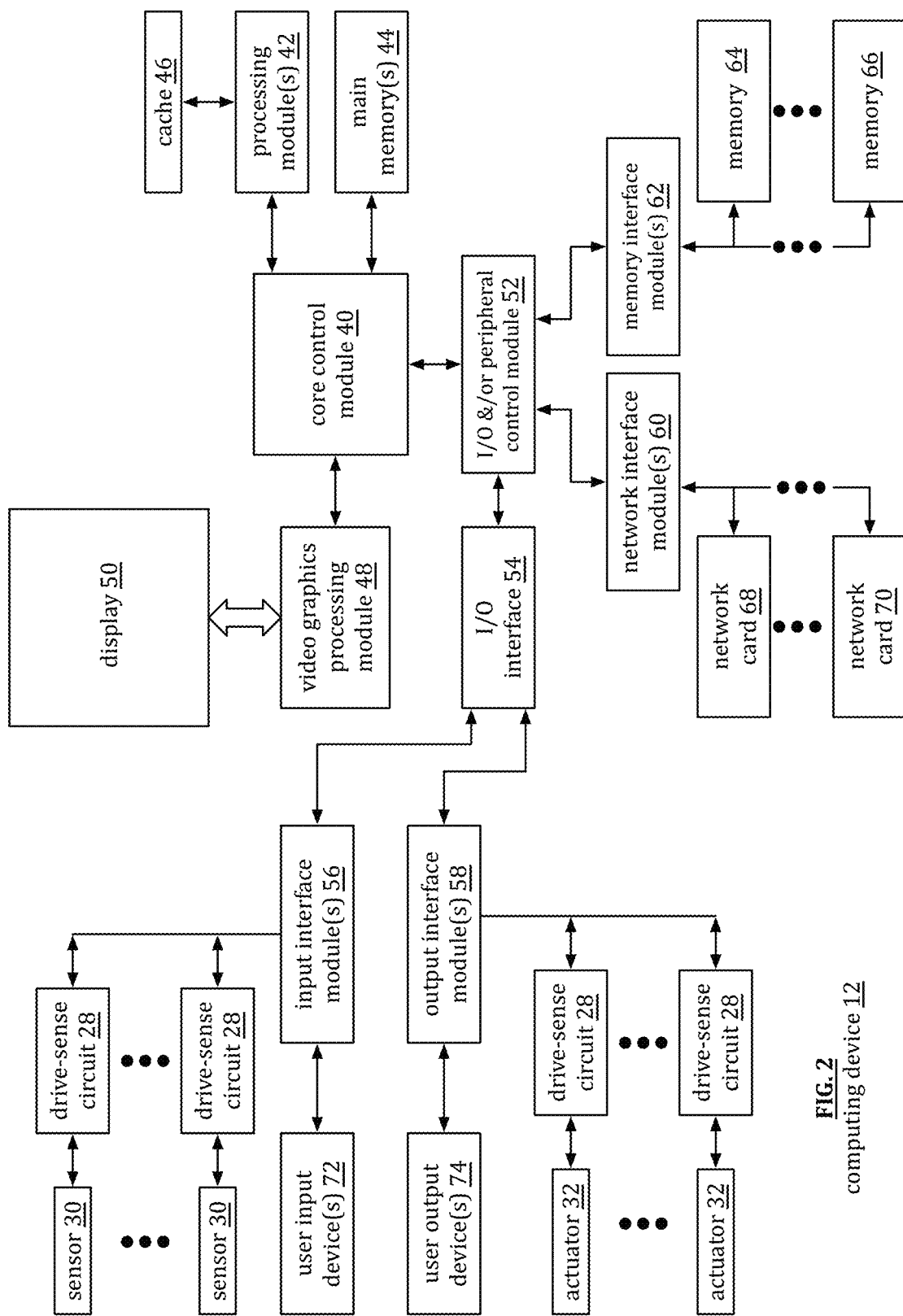
FIG. 2 is a schematic block diagram of an embodiment of a computing device in accordance with the present invention.

FIG. 2 is a schematic block diagram of an embodiment of a computing device 12 (e.g., any one of 12-1 through 12-x). The computing device 12 includes a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 2 further illustrates sensors 30 and actuators 32 coupled to drive-sense circuits 28, which are coupled to the input interface module 56 (e.g., USB port). Alternatively, one or more of the drive-sense circuits 28 is coupled to the computing device via a wireless network card (e.g., WLAN) or a wired network card (e.g., Gigabit LAN). While not shown, the computing device 12 further includes a BIOS (Basic Input Output System) memory coupled to the core control module 40.

Figure 3:
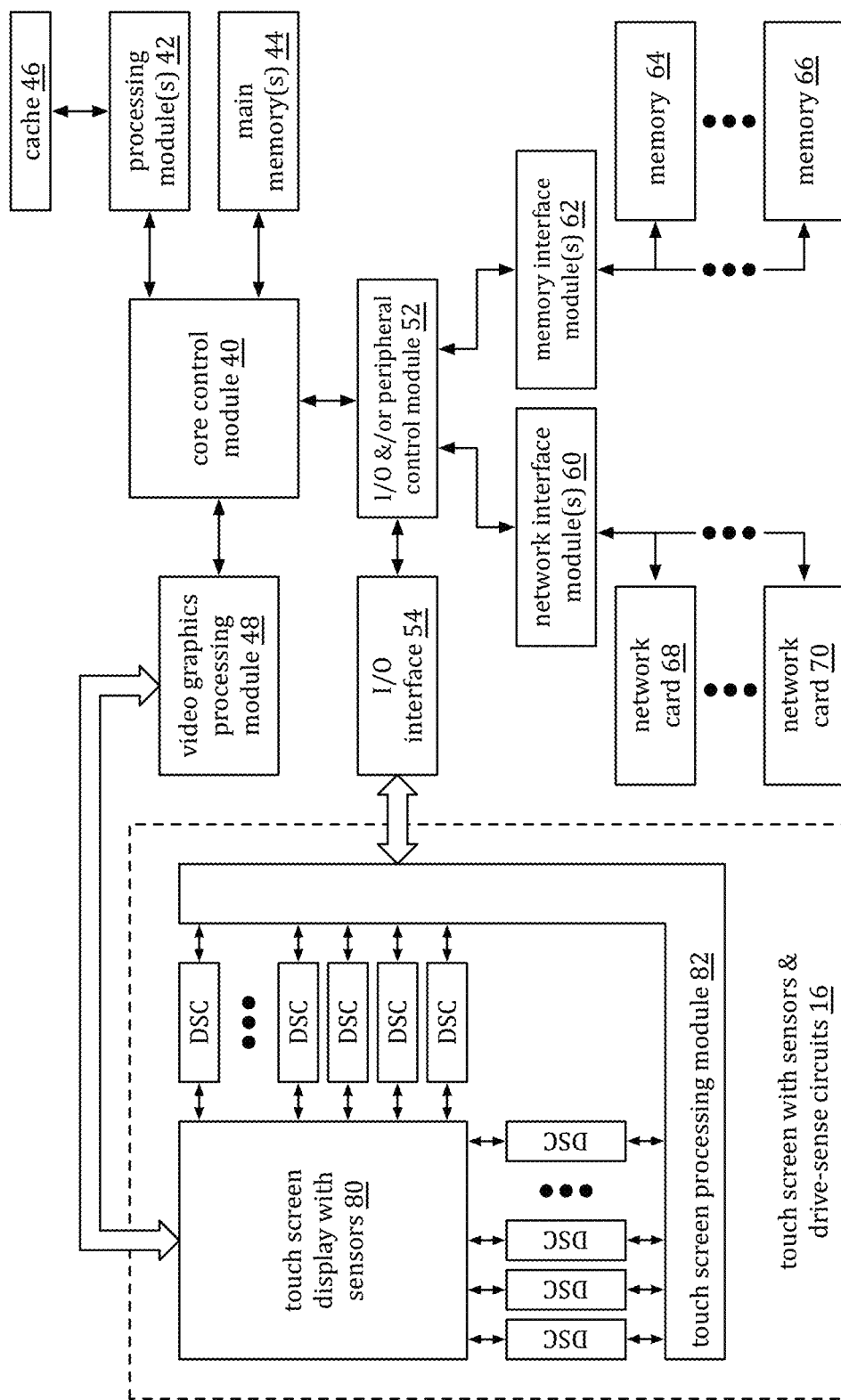
FIG. 3 is a schematic block diagram of another embodiment of a computing device in accordance with the present invention.

FIG. 3 is a schematic block diagram of another embodiment of a computing device 14 that includes a core control module 40, one or more processing modules 42, one or more main memories 44, cache memory 46, a video graphics processing module 48, a touch screen 16, an Input-Output (I/O) peripheral control module 52, one or more input interface modules 56, one or more output interface modules 58, one or more network interface modules 60, and one or more memory interface modules 62. The touch screen 16 includes a touch screen display 80, a plurality of sensors 30, a plurality of drive-sense circuits (DSC), and a touch screen processing module 82.

Computing device 14 operates similarly to computing device 12 of FIG. 2 with the addition of a touch screen as an input device. The touch screen includes a plurality of sensors (e.g., electrodes, capacitor sensing cells, capacitor sensors, inductive sensor, etc.) to detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 4:
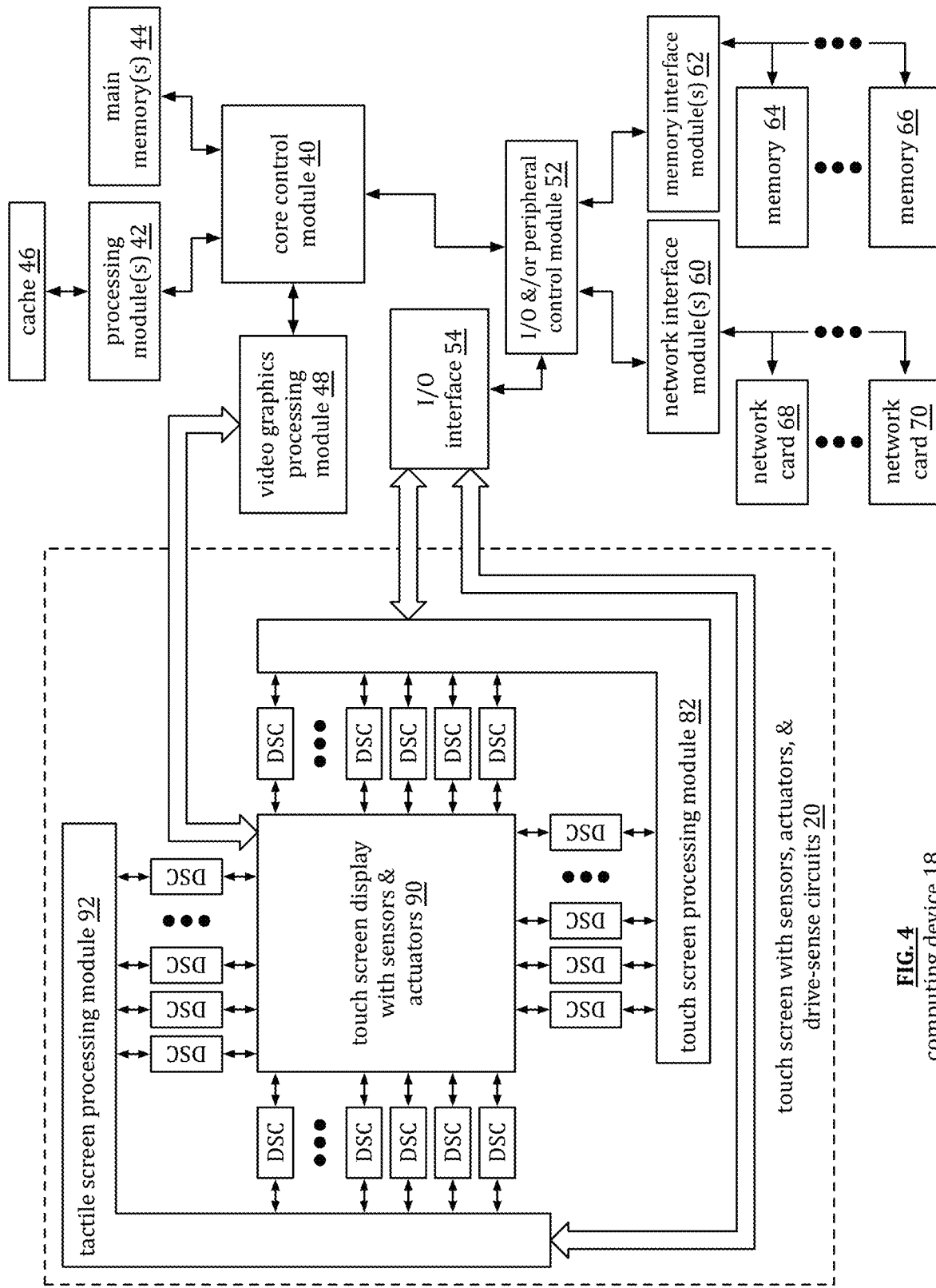
FIG. 4 is a schematic block diagram of another embodiment of a computing device in accordance with the present invention.

FIG. 4 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touch screen processing module 82, and a tactile screen processing module 92.

Computing device 18 operates similarly to computing device 14 of FIG. 3 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

Figure 5A:
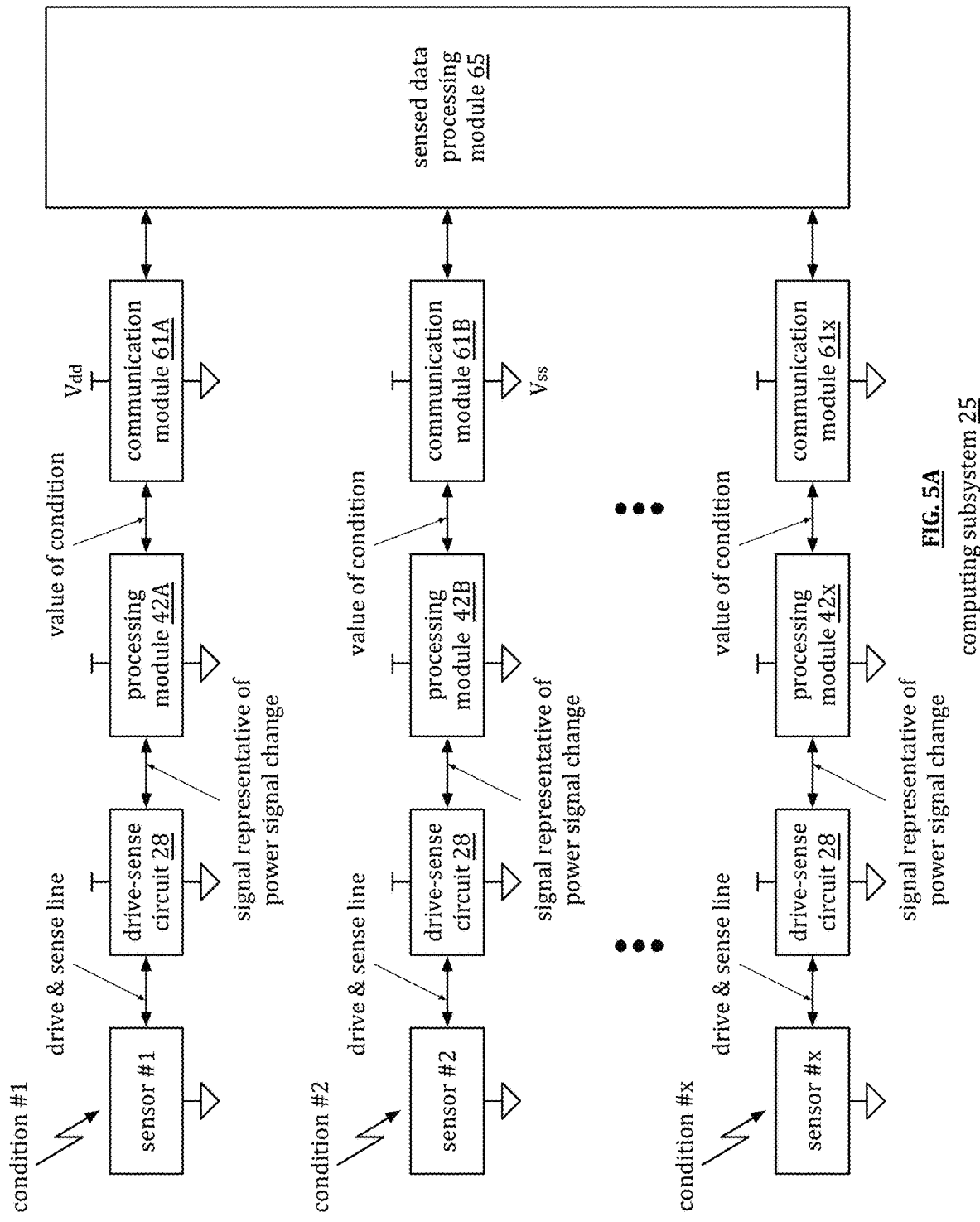
FIG. 5A is a schematic plot diagram of a computing subsystem in accordance with the present invention.

FIG. 5A is a schematic plot diagram of a computing subsystem 25 that includes a sensed data processing module 65, a plurality of communication modules 61A-x, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one or more processing modules in one or more computing devices that are different than the computing devices in which processing modules 42A-x reside.

A drive-sense circuit 28 (or multiple drive-sense circuits), a processing module (e.g., 41A), and a communication module (e.g., 61A) are within a common computing device. Each grouping of a drive-sense circuit(s), processing module, and communication module is in a separate computing device. A communication module 61A-x is constructed in accordance with one or more wired communication protocol and/or one or more wireless communication protocols that is/are in accordance with the one or more of the Open System Interconnection (OSI) model, the Transmission Control Protocol/Internet Protocol (TCP/IP) model, and other communication protocol module.

In an example of operation, a processing module (e.g., 42A) provides a control signal to its corresponding drive-sense circuit 28. The processing module 42 A may generate the control signal, receive it from the sensed data processing module 65, or receive an indication from the sensed data processing module 65 to generate the control signal. The control signal enables the drive-sense circuit 28 to provide a drive signal to its corresponding sensor. The control signal may further include a reference signal having one or more frequency components to facilitate creation of the drive signal and/or interpreting a sensed signal received from the sensor.

Based on the control signal, the drive-sense circuit 28 provides the drive signal to its corresponding sensor (e.g., 1) on a drive & sense line. While receiving the drive signal (e.g., a power signal, a regulated source signal, etc.), the sensor senses a physical condition 1-x (e.g., acoustic waves, a biological condition, a chemical condition, an electric condition, a magnetic condition, an optical condition, a thermal condition, and/or a mechanical condition). As a result of the physical condition, an electrical characteristic (e.g., impedance, voltage, current, capacitance, inductance, resistance, reactance, etc.) of the sensor changes, which affects the drive signal. Note that if the sensor is an optical sensor, it converts a sensed optical condition into an electrical characteristic.

The drive-sense circuit 28 detects the effect on the drive signal via the drive & sense line and processes the affect to produce a signal representative of power change, which may be an analog or digital signal. The processing module 42A receives the signal representative of power change, interprets it, and generates a value representing the sensed physical condition. For example, if the sensor is sensing pressure, the value representing the sensed physical condition is a measure of pressure (e.g., x PSI (pounds per square inch)).

In accordance with a sensed data process function (e.g., algorithm, application, etc.), the sensed data processing module 65 gathers the values representing the sensed physical conditions from the processing modules. Since the sensors 1-x may be the same type of sensor (e.g., a pressure sensor), may each be different sensors, or a combination thereof; the sensed physical conditions may be the same, may each be different, or a combination thereof. The sensed data processing module 65 processes the gathered values to produce one or more desired results. For example, if the computing subsystem 25 is monitoring pressure along a pipeline, the processing of the gathered values indicates that the pressures are all within normal limits or that one or more of the sensed pressures is not within normal limits.

As another example, if the computing subsystem 25 is used in a manufacturing facility, the sensors are sensing a variety of physical conditions, such as acoustic waves (e.g., for sound proofing, sound generation, ultrasound monitoring, etc.), a biological condition (e.g., a bacterial contamination, etc.) a chemical condition (e.g., composition, gas concentration, etc.), an electric condition (e.g., current levels, voltage levels, electro-magnetic interference, etc.), a magnetic condition (e.g., induced current, magnetic field strength, magnetic field orientation, etc.), an optical condition (e.g., ambient light, infrared, etc.), a thermal condition (e.g., temperature, etc.), and/or a mechanical condition (e.g., physical position, force, pressure, acceleration, etc.).

The computing subsystem 25 may further include one or more actuators in place of one or more of the sensors and/or in addition to the sensors. When the computing subsystem 25 includes an actuator, the corresponding processing module provides an actuation control signal to the corresponding drive-sense circuit 28. The actuation control signal enables the drive-sense circuit 28 to provide a drive signal to the actuator via a drive & actuate line (e.g., similar to the drive & sense line, but for the actuator). The drive signal includes one or more frequency components and/or amplitude components to facilitate a desired actuation of the actuator.

In addition, the computing subsystem 25 may include an actuator and sensor working in concert. For example, the sensor is sensing the physical condition of the actuator. In this example, a drive-sense circuit provides a drive signal to the actuator and another drive sense signal provides the same drive signal, or a scaled version of it, to the sensor. This allows the sensor to provide near immediate and continuous sensing of the actuator's physical condition. This further allows for the sensor to operate at a first frequency and the actuator to operate at a second frequency.

In an embodiment, the computing subsystem is a standalone system for a wide variety of applications (e.g., manufacturing, pipelines, testing, monitoring, security, etc.). In another embodiment, the computing subsystem 25 is one subsystem of a plurality of subsystems forming a larger system. For example, different subsystems are employed based on geographic location. As a specific example, the computing subsystem 25 is deployed in one section of a factory and another computing subsystem is deployed in another part of the factory. As another example, different subsystems are employed based function of the subsystems. As a specific example, one subsystem monitors a city's traffic light operation and another subsystem monitors the city's sewage treatment plants.

Regardless of the use and/or deployment of the computing system, the physical conditions it is sensing, and/or the physical conditions it is actuating, each sensor and each actuator (if included) is driven and sensed by a single line as opposed to separate drive and sense lines. This provides many advantages including, but not limited to, lower power requirements, better ability to drive high impedance sensors, lower line to line interference, and/or concurrent sensing functions.

FIG. 5B is a schematic block diagram of another embodiment of a computing subsystem 25 that includes a sensed data processing module 65, a communication module 61, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one or more processing modules in one or more computing devices that are different than the computing device, devices, in which processing modules 42A-x reside.

In an embodiment, the drive-sense circuits 28, the processing modules, and the communication module are within a common computing device. For example, the computing device includes a central processing unit that includes a plurality of processing modules. The functionality and operation of the sensed data processing module 65, the communication module 61, the processing modules 42A-x, the drive sense circuits 28, and the sensors 1-x are as discussed with reference to FIG. 5A.

Figure 5C:
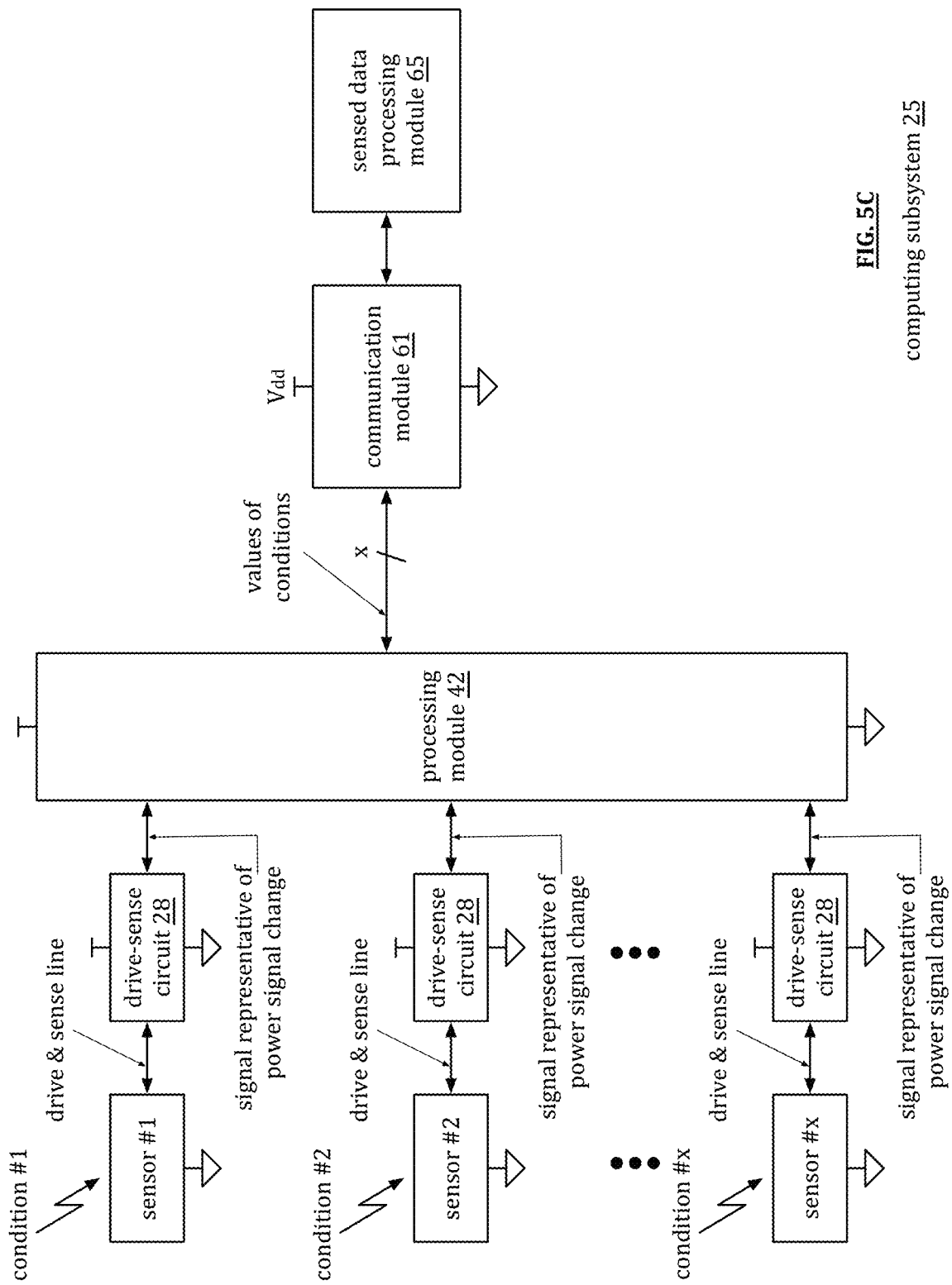
FIG. 5C is a schematic block diagram of another embodiment of a computing subsystem in accordance with the present invention.

FIG. 5C is a schematic block diagram of another embodiment of a computing subsystem 25 that includes a sensed data processing module 65, a communication module 61, a processing module 42, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device in which the processing module 42 resides.

In an embodiment, the drive-sense circuits 28, the processing module, and the communication module are within a common computing device. The functionality and operation of the sensed data processing module 65, the communication module 61, the processing module 42, the drive sense circuits 28, and the sensors 1-x are as discussed with reference to FIG. 5A.

Figure 5D:
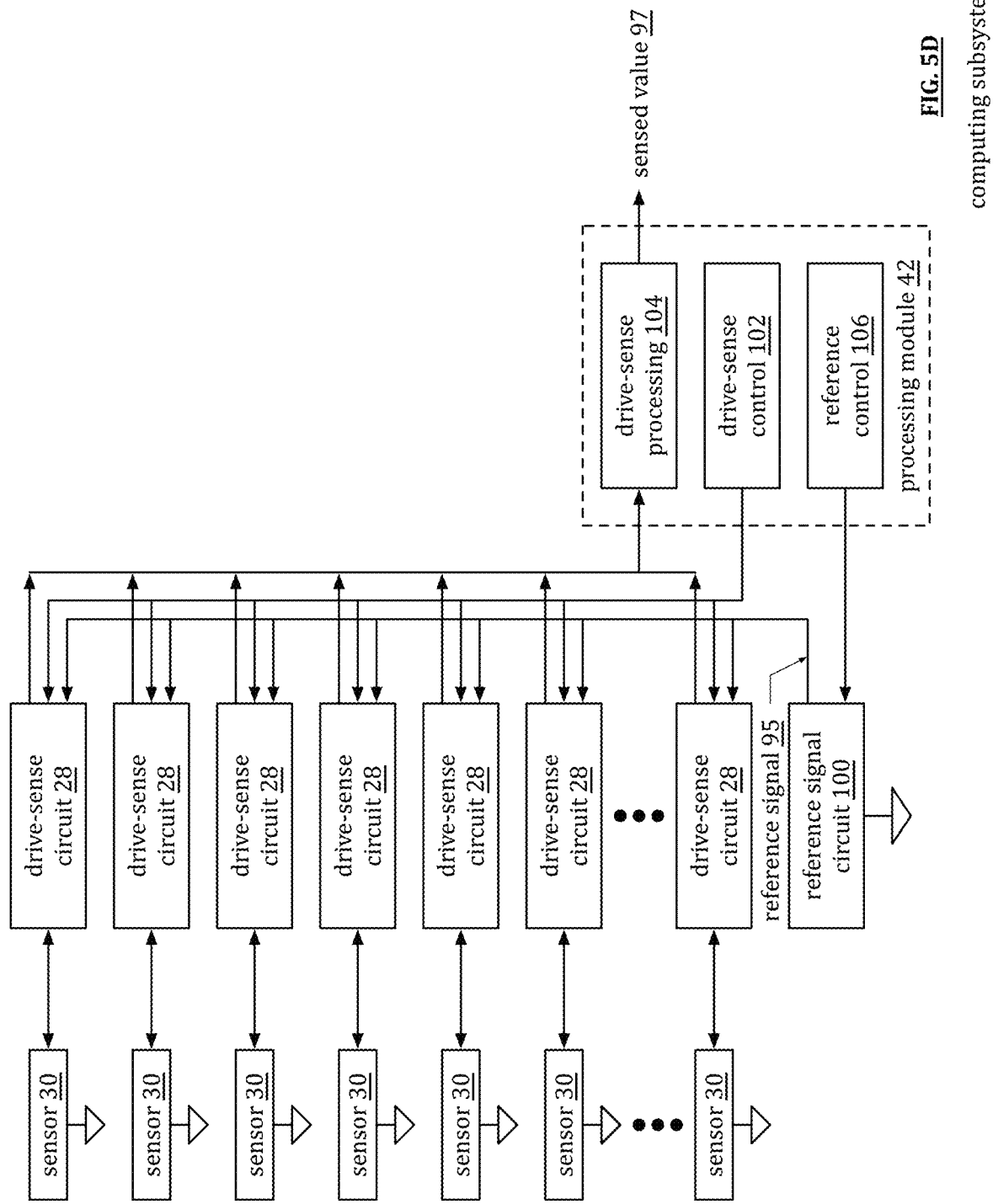
FIG. 5D is a schematic block diagram of another embodiment of a computing subsystem in accordance with the present invention.

FIG. 5D is a schematic block diagram of another embodiment of a computing subsystem 25 that includes a processing module 42, a reference signal circuit 100, a plurality of drive sense circuits 28, and a plurality of sensors 30. The processing module 42 includes a drive-sense processing block 104, a drive-sense control block 102, and a reference control block 106. Each block 102-106 of the processing module 42 may be implemented via separate modules of the processing module, may be a combination of software and hardware within the processing module, and/or may be field programmable modules within the processing module 42.

In an example of operation, the drive-sense control block 104 generates one or more control signals to activate one or more of the drive-sense circuits 28. For example, the drive-sense control block 102 generates a control signal that enables of the drive-sense circuits 28 for a given period of time (e.g., 1 second, 1 minute, etc.). As another example, the drive-sense control block 102 generates control signals to sequentially enable the drive-sense circuits 28. As yet another example, the drive-sense control block 102 generates a series of control signals to periodically enable the drive-sense circuits 28 (e.g., enabled once every second, every minute, every hour, etc.).

Continuing with the example of operation, the reference control block 106 generates a reference control signal that it provides to the reference signal circuit 100. The reference signal circuit 100 generates, in accordance with the control signal, one or more reference signals for the drive-sense circuits 28. For example, the control signal is an enable signal, which, in response, the reference signal circuit 100 generates a pre-programmed reference signal that it provides to the drive-sense circuits 28. In another example, the reference signal circuit 100 generates a unique reference signal for each of the drive-sense circuits 28. In yet another example, the reference signal circuit 100 generates a first unique reference signal for each of the drive-sense circuits 28 in a first group and generates a second unique reference signal for each of the drive-sense circuits 28 in a second group.

The reference signal circuit 100 may be implemented in a variety of ways. For example, the reference signal circuit 100 includes a DC (direct current) voltage generator, an AC voltage generator, and a voltage combining circuit. The DC voltage generator generates a DC voltage at a first level and the AC voltage generator generates an AC voltage at a second level, which is less than or equal to the first level. The voltage combining circuit combines the DC and AC voltages to produce the reference signal. As examples, the reference signal circuit 100 generates a reference signal similar to the signals shown in FIG. 7, which will be subsequently discussed.

As another example, the reference signal circuit 100 includes a DC current generator, an AC current generator, and a current combining circuit. The DC current generator generates a DC current a first current level and the AC current generator generates an AC current at a second current level, which is less than or equal to the first current level. The current combining circuit combines the DC and AC currents to produce the reference signal.

Returning to the example of operation, the reference signal circuit 100 provides the reference signal, or signals, to the drive-sense circuits 28. When a drive-sense circuit 28 is enabled via a control signal from the drive sense control block 102, it provides a drive signal to its corresponding sensor 30. As a result of a physical condition, an electrical characteristic of the sensor is changed, which affects the drive signal. Based on the detected effect on the drive signal and the reference signal, the drive-sense circuit 28 generates a signal representative of the effect on the drive signal.

The drive-sense circuit provides the signal representative of the effect on the drive signal to the drive-sense processing block 104. The drive-sense processing block 104 processes the representative signal to produce a sensed value 97 of the physical condition (e.g., a digital value that represents a specific temperature, a specific pressure level, etc.). The processing module 42 provides the sensed value 97 to another application running on the computing device, to another computing device, and/or to a server 22.

Figure 5E:
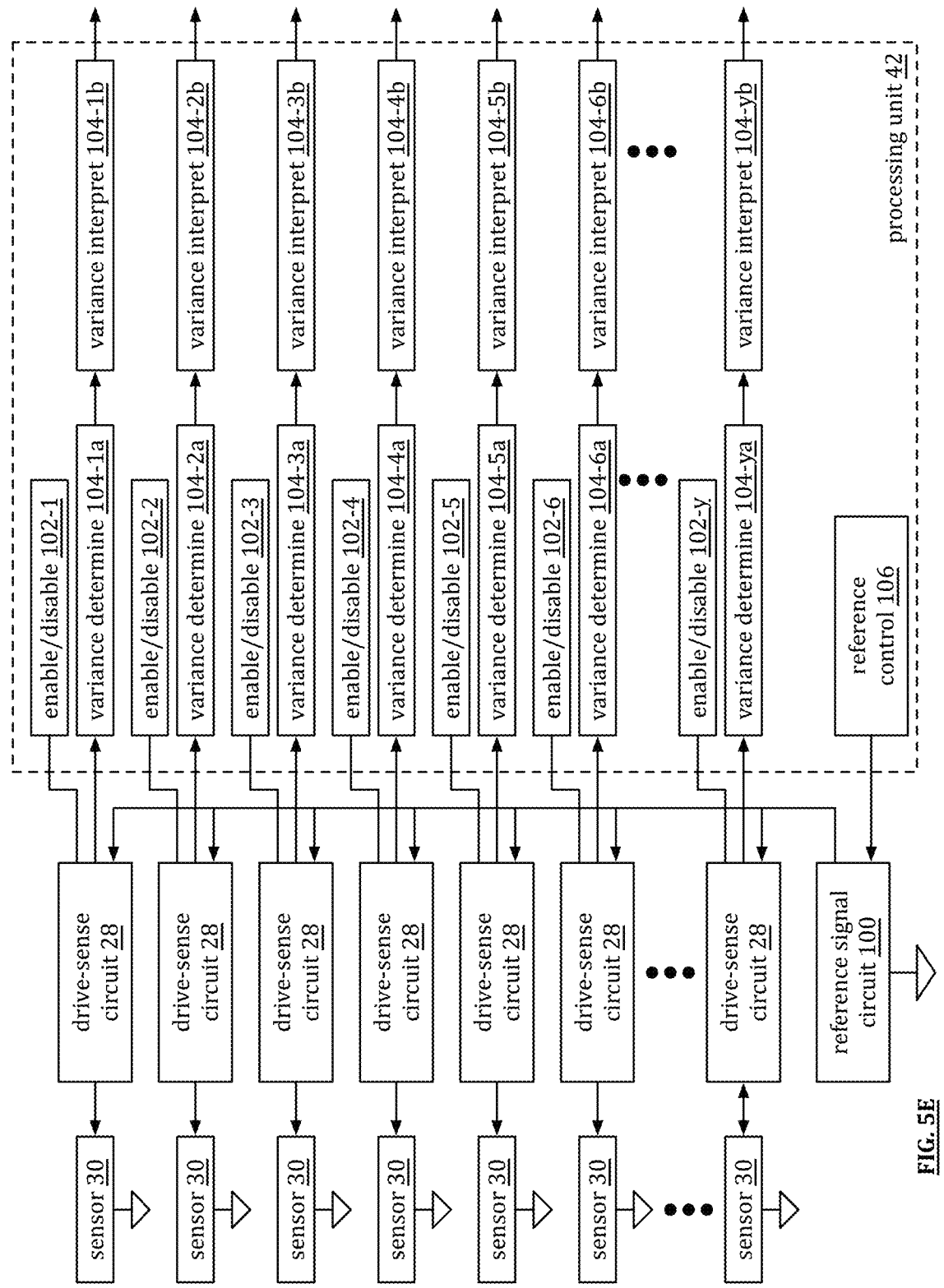
FIG. 5E is a schematic block diagram of another embodiment of a computing subsystem in accordance with the present invention.

FIG. 5E is a schematic block diagram of another embodiment of a computing subsystem 25 that includes a processing module 42, a plurality of drive sense circuits 28, and a plurality of sensors 30. This embodiment is similar to the embodiment of FIG. 5D with the functionality of the drive-sense processing block 104, a drive-sense control block 102, and a reference control block 106 shown in greater detail. For instance, the drive-sense control block 102 includes individual enable/disable blocks 102-1 through 102-y. An enable/disable block functions to enable or disable a corresponding drive-sense circuit in a manner as discussed above with reference to FIG. 5D.

The drive-sense processing block 104 includes variance determining modules 104-1a through y and variance interpreting modules 104-2a through y. For example, variance determining module 104-1a receives, from the corresponding drive-sense circuit 28, a signal representative of a physical condition sensed by a sensor. The variance determining module 104-1a functions to determine a difference from the signal representing the sensed physical condition with a signal representing a known, or reference, physical condition. The variance interpreting module 104-1b interprets the difference to determine a specific value for the sensed physical condition.

As a specific example, the variance determining module 104-1a receives a digital signal of 10010110 (150 in decimal) that is representative of a sensed physical condition (e.g., temperature) sensed by a sensor from the corresponding drive-sense circuit 28. With 8-bits, there are $2^8$ (256) possible signals representing the sensed physical condition. Assume that the units for temperature is Celsius and a digital value of 01000000 (64 in decimal) represents the known value for 25 degree Celsius. The variance determining module 104-b 1 determines the difference between the digital signal representing the sensed value (e.g., 10010110, 150 in decimal) and the known signal value of (e.g., 01000000, 64 in decimal), which is 00110000 (86 in decimal). The variance determining module 104-b1 then determines the sensed value based on the difference and the known value. In this example, the sensed value equals 25+86*(100/256)=25+33.6=58.6 degrees Celsius.

Figure 6A:
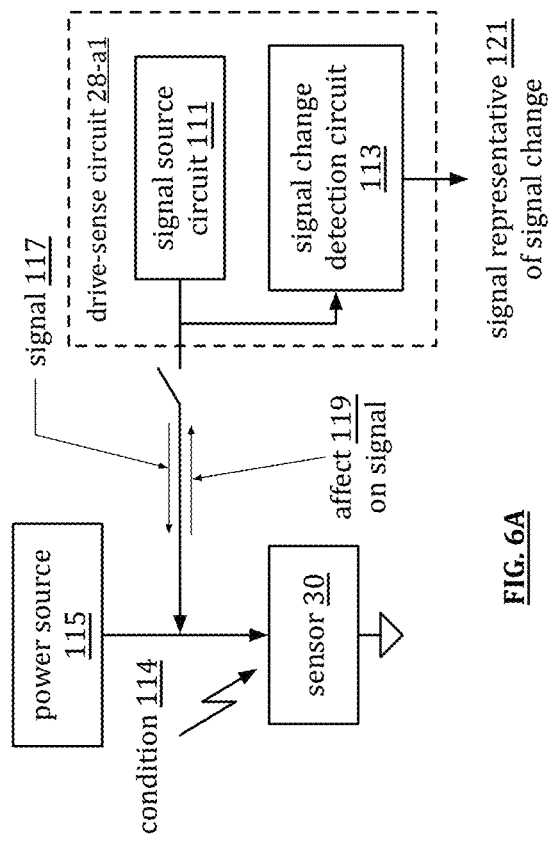
FIG. 6A is a schematic block diagram of another embodiment of a drive sense circuit in accordance with the present invention.
Figure 6:
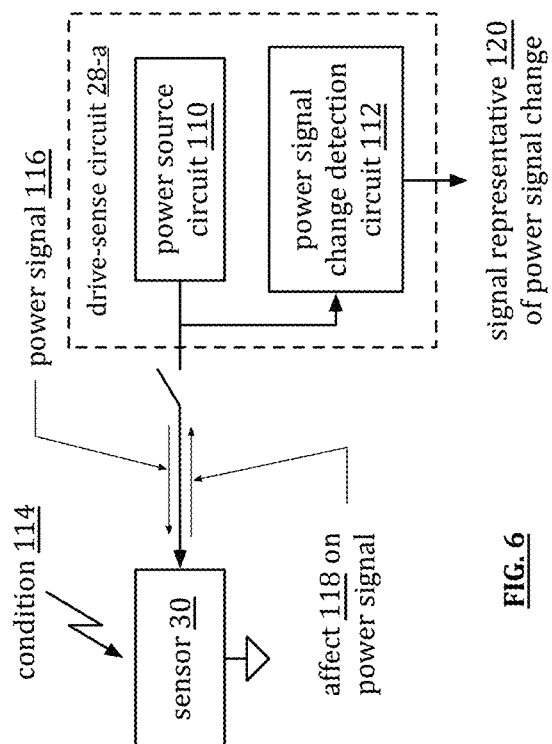
FIG. 6 is a schematic block diagram of a drive center circuit in accordance with the present invention.

FIG. 6 is a schematic block diagram of a drive center circuit 28-a coupled to a sensor 30. The drive sense-sense circuit 28 includes a power source circuit 110 and a power signal change detection circuit 112. The sensor 30 includes one or more transducers that have varying electrical characteristics (e.g., capacitance, inductance, impedance, current, voltage, etc.) based on varying physical conditions 114 (e.g., pressure, temperature, biological, chemical, etc.), or vice versa (e.g., an actuator).

The power source circuit 110 is operably coupled to the sensor 30 and, when enabled (e.g., from a control signal from the processing module 42, power is applied, a switch is closed, a reference signal is received, etc.) provides a power signal 116 to the sensor 30. The power source circuit 110 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provide a desired power level to the sensor and substantially matches impedance of the sensor. The power source circuit 110 generates the power signal 116 to include a DC (direct current) component and/or an oscillating component.

When receiving the power signal 116 and when exposed to a condition 114, an electrical characteristic of the sensor affects 118 the power signal. When the power signal change detection circuit 112 is enabled, it detects the affect 118 on the power signal as a result of the electrical characteristic of the sensor. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

As another example, the power signal is a 1.5 voltage signal and, under a first condition, the sensor draws 1 milliamp of current, which corresponds to an impedance of 1.5 K Ohms. Under a second conditions, the power signal drops to 1.3 volts and the current increases to 1.3 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

Figure 7:
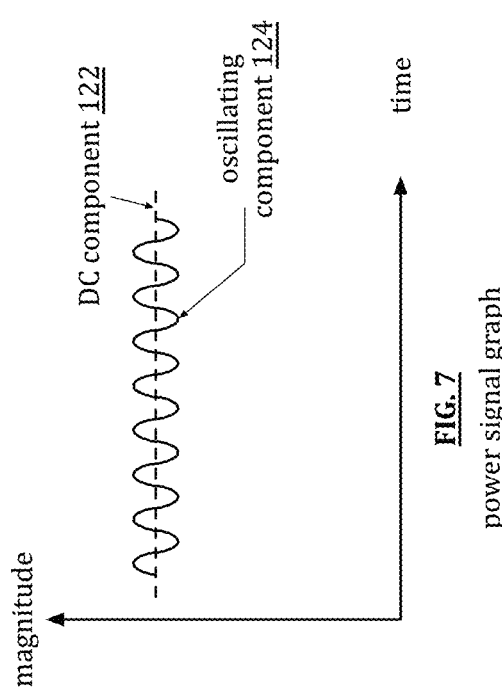
FIG. 7 is an example of a power signal graph in accordance with the present invention.

The power signal 116 includes a DC component 122 and/or an oscillating component 124 as shown in FIG. 7. The oscillating component 124 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). Note that the power signal is shown without affect from the sensor as the result of a condition or changing condition.

In an embodiment, power generating circuit 110 varies frequency of the oscillating component 124 of the power signal 116 so that it can be tuned to the impedance of the sensor and/or to be off-set in frequency from other power signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

In an embodiment, the power generating circuit 110 varies magnitude of the DC component 122 and/or the oscillating component 124 to improve resolution of sensing and/or to adjust power consumption of sensing. In addition, the power generating circuit 110 generates the drive signal 110 such that the magnitude of the oscillating component 124 is less than magnitude of the DC component 122.

FIG. 6A is a schematic block diagram of a drive center circuit 28-a1 coupled to a sensor 30. The drive sense-sense circuit 28-a1 includes a signal source circuit 111, a signal change detection circuit 113, and a power source 115. The power source 115 (e.g., a battery, a power supply, a current source, etc.) generates a voltage and/or current that is combined with a signal 117, which is produced by the signal source circuit 111. The combined signal is supplied to the sensor 30.

The signal source circuit 111 may be a voltage supply circuit (e.g., a battery, a linear regulator, an unregulated DC-to-DC converter, etc.) to produce a voltage-based signal 117, a current supply circuit (e.g., a current source circuit, a current mirror circuit, etc.) to produce a current-based signal 117, or a circuit that provide a desired power level to the sensor and substantially matches impedance of the sensor. The signal source circuit 111 generates the signal 117 to include a DC (direct current) component and/or an oscillating component.

When receiving the combined signal (e.g., signal 117 and power from the power source) and when exposed to a condition 114, an electrical characteristic of the sensor affects 119 the signal. When the signal change detection circuit 113 is enabled, it detects the affect 119 on the signal as a result of the electrical characteristic of the sensor.

Figure 8:
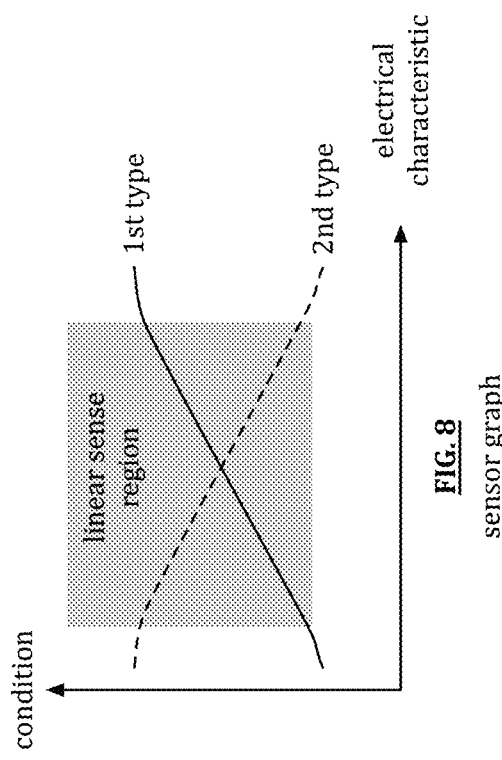
FIG. 8 is an example of a sensor graph in accordance with the present invention.

FIG. 8 is an example of a sensor graph that plots an electrical characteristic versus a condition. The sensor has a substantially linear region in which an incremental change in a condition produces a corresponding incremental change in the electrical characteristic. The graph shows two types of electrical characteristics: one that increases as the condition increases and the other that decreases and the condition increases. As an example of the first type, impedance of a temperature sensor increases and the temperature increases. As an example of a second type, a capacitance touch sensor decreases in capacitance as a touch is sensed.

Figure 9:
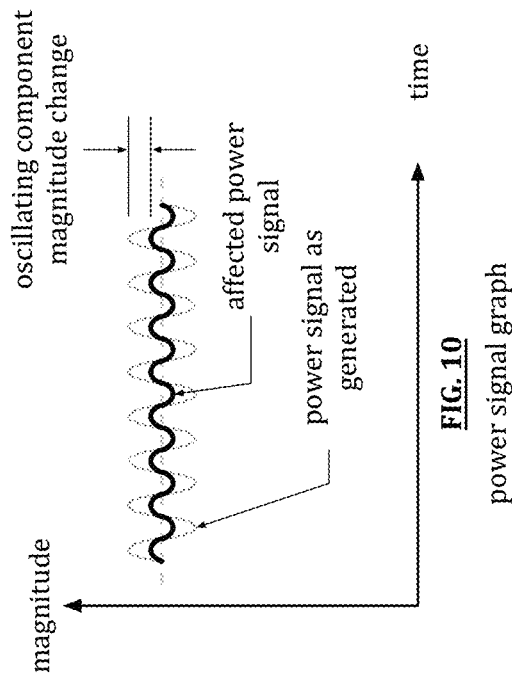
FIG. 9 is a schematic block diagram of another example of a power signal graph in accordance with the present invention.

FIG. 9 is a schematic block diagram of another example of a power signal graph in which the electrical characteristic or change in electrical characteristic of the sensor is affecting the power signal. In this example, the effect of the electrical characteristic or change in electrical characteristic of the sensor reduced the DC component but had little to no effect on the oscillating component. For example, the electrical characteristic is resistance. In this example, the resistance or change in resistance of the sensor decreased the power signal, inferring an increase in resistance for a relatively constant current.

Figure 10:
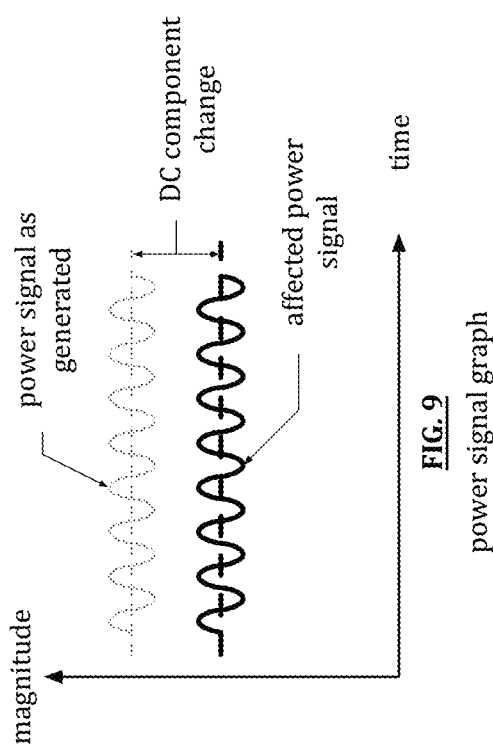
FIG. 10 is a schematic block diagram of another example of a power signal graph in accordance with the present invention.

FIG. 10 is a schematic block diagram of another example of a power signal graph in which the electrical characteristic or change in electrical characteristic of the sensor is affecting the power signal. In this example, the effect of the electrical characteristic or change in electrical characteristic of the sensor reduced magnitude of the oscillating component but had little to no effect on the DC component. For example, the electrical characteristic is impedance of a capacitor and/or an inductor. In this example, the impedance or change in impedance of the sensor decreased the magnitude of the oscillating signal component, inferring an increase in impedance for a relatively constant current.

Figure 11:
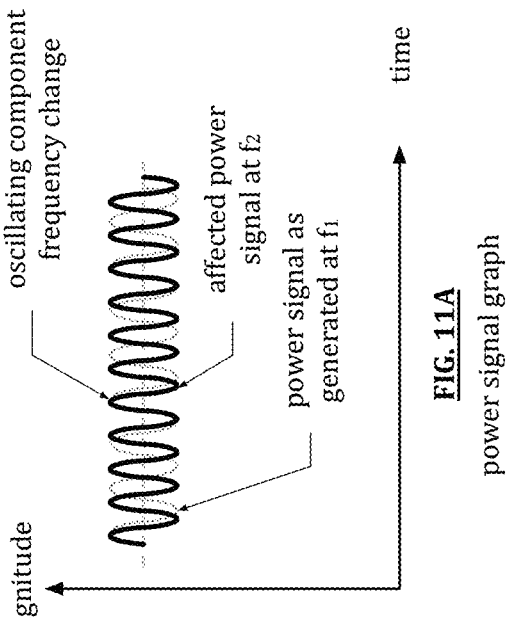
FIG. 11 is a schematic block diagram of another example of a power signal graph in accordance with the present invention.

FIG. 11 is a schematic block diagram of another example of a power signal graph in which the electrical characteristic or change in electrical characteristic of the sensor is affecting the power signal. In this example, the effect of the electrical characteristic or change in electrical characteristic of the sensor shifted frequency of the oscillating component but had little to no effect on the DC component. For example, the electrical characteristic is reactance of a capacitor and/or an inductor. In this example, the reactance or change in reactance of the sensor shifted frequency of the oscillating signal component, inferring an increase in reactance (e.g., sensor is functioning as an integrator or phase shift circuit).

Figure 11A:
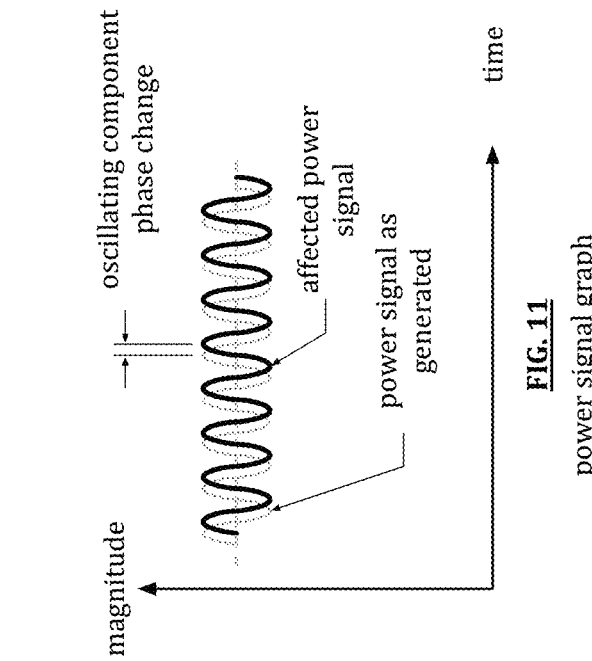
FIG. 11A is a schematic block diagram of another example of a power signal graph in accordance with the present invention.

FIG. 11A is a schematic block diagram of another example of a power signal graph in which the electrical characteristic or change in electrical characteristic of the sensor is affecting the power signal. In this example, the effect of the electrical characteristic or change in electrical characteristic of the sensor changes the frequency of the oscillating component but had little to no effect on the DC component. For example, the sensor includes two transducers that oscillate at different frequencies. The first transducer receives the power signal at a frequency of $f_1$ and converts it into a first physical condition. The second transducer is stimulated by the first physical condition to create an electrical signal at a different frequency $f_2$. In this example, the first and second transducers of the sensor change the frequency of the oscillating signal component, which allows for more granular sensing and/or a broader range of sensing.

Figure 12:
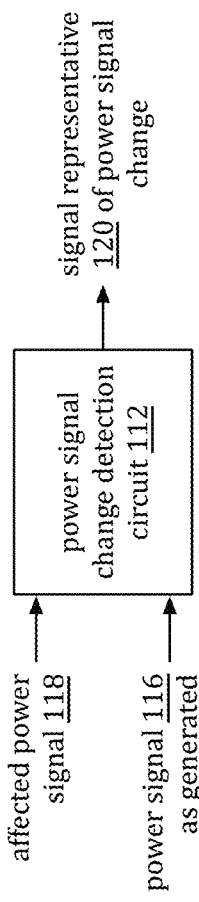
FIG. 12 is a schematic block diagram of an embodiment of a power signal change detection circuit in accordance with the present invention.

FIG. 12 is a schematic block diagram of an embodiment of a power signal change detection circuit 112 receiving the affected power signal 118 and the power signal 116 as generated to produce, therefrom, the signal representative 120 of the power signal change. The affect 118 on the power signal is the result of an electrical characteristic and/or change in the electrical characteristic of a sensor; a few examples of the affects are shown in FIGS. 8-11A.

In an embodiment, the power signal change detection circuit 112 detect a change in the DC component 122 and/or the oscillating component 124 of the power signal 116. The power signal change detection circuit 112 then generates the signal representative 120 of the change to the power signal based on the change to the power signal. For example, the change to the power signal results from the impedance of the sensor and/or a change in impedance of the sensor. The representative signal 120 is reflective of the change in the power signal and/or in the change in the sensor's impedance.

In an embodiment, the power signal change detection circuit 112 is operable to detect a change to the oscillating component at a frequency, which may be a phase shift, frequency change, and/or change in magnitude of the oscillating component. The power signal change detection circuit 112 is also operable to generate the signal representative of the change to the power signal based on the change to the oscillating component at the frequency. The power signal change detection circuit 112 is further operable to provide feedback to the power source circuit 110 regarding the oscillating component. The feedback allows the power source circuit 110 to regulate the oscillating component at the desired frequency, phase, and/or magnitude.

Figure 13:
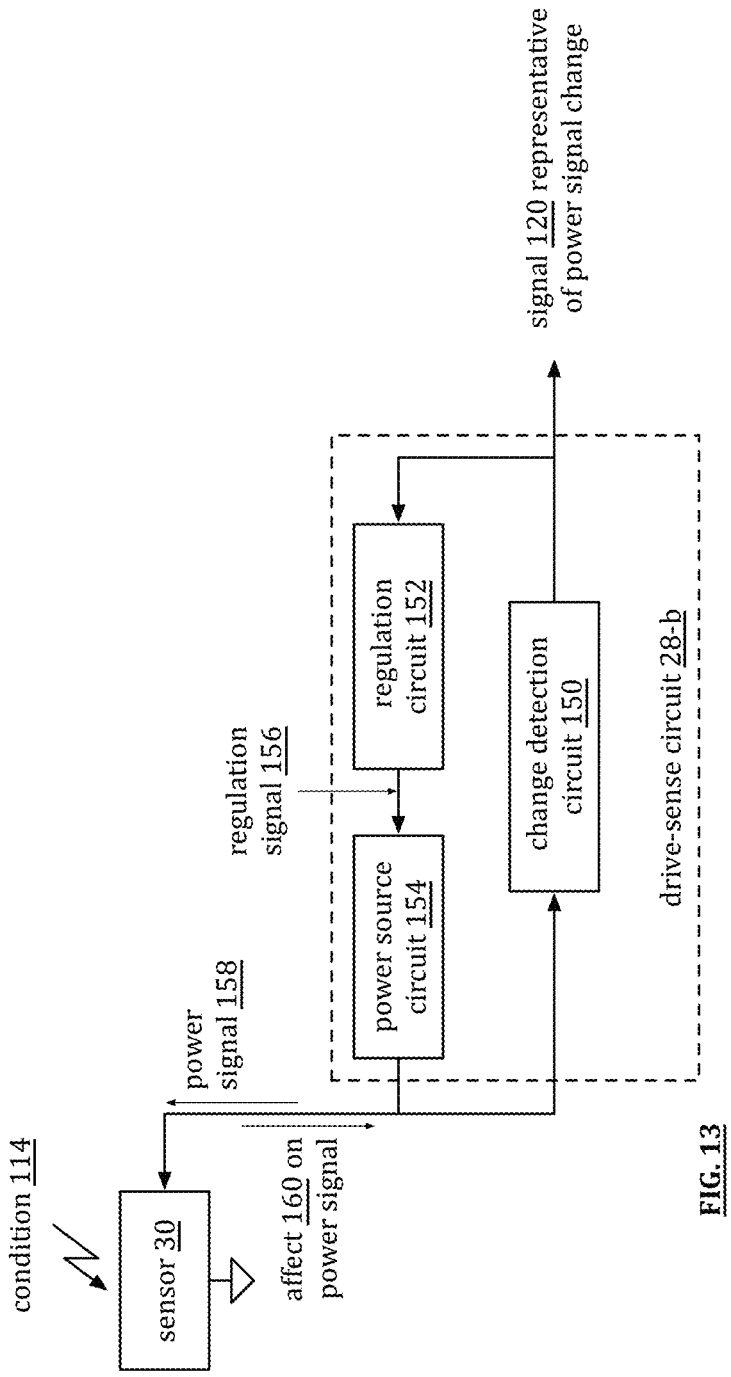
FIG. 13 is a schematic block diagram of another embodiment of a drive-sense circuit in accordance with the present invention.

FIG. 13 is a schematic block diagram of another embodiment of a drive sense circuit 28-b includes a change detection circuit 150, a regulation circuit 152, and a power source circuit 154. The drive-sense circuit 28-b is coupled to the sensor 30, which includes a transducer that has varying electrical characteristics (e.g., capacitance, inductance, impedance, current, voltage, etc.) based on varying physical conditions 114 (e.g., pressure, temperature, biological, chemical, etc.).

The power source circuit 154 is operably coupled to the sensor 30 and, when enabled (e.g., from a control signal from the processing module 42, power is applied, a switch is closed, a reference signal is received, etc.) provides a power signal 158 to the sensor 30. The power source circuit 154 may be a voltage supply circuit (e.g., a battery, a linear regulator, an unregulated DC-to-DC converter, etc.) to produce a voltage-based power signal or a current supply circuit (e.g., a current source circuit, a current mirror circuit, etc.) to produce a current-based power signal. The power source circuit 154 generates the power signal 158 to include a DC (direct current) component and an oscillating component.

When receiving the power signal 158 and when exposed to a condition 114, an electrical characteristic of the sensor affects 160 the power signal. When the change detection circuit 150 is enabled, it detects the affect 160 on the power signal as a result of the electrical characteristic of the sensor 30. The change detection circuit 150 is further operable to generate a signal 120 that is representative of change to the power signal based on the detected effect on the power signal.

The regulation circuit 152, when its enabled, generates regulation signal 156 to regulate the DC component to a desired DC level and/or regulate the oscillating component to a desired oscillating level (e.g., magnitude, phase, and/or frequency) based on the signal 120 that is representative of the change to the power signal. The power source circuit 154 utilizes the regulation signal 156 to keep the power signal at a desired setting 158 regardless of the electrical characteristic of the sensor. In this manner, the amount of regulation is indicative of the affect the electrical characteristic had on the power signal.

In an example, the power source circuit 158 is a DC-DC converter operable to provide a regulated power signal having DC and AC components. The change detection circuit 150 is a comparator and the regulation circuit 152 is a pulse width modulator to produce the regulation signal 156. The comparator compares the power signal 158, which is affected by the sensor, with a reference signal that includes DC and AC components. When the electrical characteristics is at a first level (e.g., a first impedance), the power signal is regulated to provide a voltage and current such that the power signal substantially resembles the reference signal.

When the electrical characteristics changes to a second level (e.g., a second impedance), the change detection circuit 150 detects a change in the DC and/or AC component of the power signal 158 and generates the representative signal 120, which indicates the changes. The regulation circuit 152 detects the change in the representative signal 120 and creates the regulation signal to substantially remove the effect on the power signal. The regulation of the power signal 158 may be done by regulating the magnitude of the DC and/or AC components, by adjusting the frequency of AC component, and/or by adjusting the phase of the AC component.

With respect to the operation of various drive-sense circuits as described herein and/or their equivalents, note that the operation of such a drive-sense circuit is operable simultaneously to drive and sense a signal via a single line. In comparison to switched, time-divided, time-multiplexed, etc. operation in which there is switching between driving and sensing (e.g., driving at first time, sensing at second time, etc.) of different respective signals at separate and distinct times, the drive-sense circuit is operable simultaneously to perform both driving and sensing of a signal. In some examples, such simultaneous driving and sensing is performed via a single line using a drive-sense circuit.

In addition, other alternative implementations of various drive-sense circuits are described in U.S. Utility patent application Ser. No. 16/113,379, entitled "DRIVE SENSE CIRCUIT WITH DRIVE-SENSE LINE," filed Aug. 27, 2018, pending. Any instantiation of a drive-sense circuit as described herein may also be implemented using any of the various implementations of various drive-sense circuits described in U.S. Utility patent application Ser. No. 16/113, 379.

In addition, note that the one or more signals provided from a drive-sense circuit (DSC) may be of any of a variety of types. For example, such a signal may be based on encoding of one or more bits to generate one or more coded bits used to generate modulation data (or generally, data). For example, a device is configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof.

Also, the one or more coded bits may then undergo modulation or symbol mapping to generate modulation symbols (e.g., the modulation symbols may include data intended for one or more recipient devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In addition, note that a signal provided from a DSC may be of a unique frequency that is different from signals provided from other DSCs. Also, a signal provided from a DSC may include multiple frequencies independently or simultaneously. The frequency of the signal can be hopped on a pre-arranged pattern. In some examples, a handshake is established between one or more DSCs and one or more processing module (e.g., one or more controllers) such that the one or more DSC is/are directed by the one or more processing modules regarding which frequency or frequencies and/or which other one or more characteristics of the one or more signals to use at one or more respective times and/or in one or more particular situations.

With respect to any signal that is driven and simultaneously detected by a DSC, note that any additional signal that is coupled into a line, an electrode, a touch sensor, a bus, a communication link, a battery, a load, an electrical coupling or connection, etc. associated with that DSC is also detectable. For example, a DSC that is associated with such a line, an electrode, a touch sensor, a bus, a communication link, a battery, a load, an electrical coupling or connection, etc. is configured to detect any signal from one or more other lines, electrodes, touch sensors, buses, communication links, loads, electrical couplings or connections, etc. that get coupled into that line, electrode, touch sensor, bus, communication link, battery, load, electrical coupling or connection, etc.

Note that the different respective signals that are driven and simultaneously sensed by one or more DSCs may be are differentiated from one another. Appropriate filtering and processing can identify the various signals given their differentiation, orthogonality to one another, difference in frequency, etc. Other examples described herein and their equivalents operate using any of a number of different characteristics other than or in addition to frequency.

Moreover, with respect to any embodiment, diagram, example, etc. that includes more than one DSC, note that the DSCs may be implemented in a variety of manners. For example, all of the DSCs may be of the same type, implementation, configuration, etc. In another example, the first DSC may be of a first type, implementation, configuration, etc., and a second DSC may be of a second type, implementation, configuration, etc. that is different than the first DSC. Considering a specific example, a first DSC may be implemented to detect change of impedance associated with a line, an electrode, a touch sensor, a bus, a communication link, an electrical coupling or connection, etc. associated with that first DSC, while a second DSC may be implemented to detect change of voltage associated with a line, an electrode, a touch sensor, a bus, a communication link, an electrical coupling or connection, etc. associated with that second DSC. In addition, note that a third DSC may be implemented to detect change of a current associated with a line, an electrode, a touch sensor, a bus, a communication link, an electrical coupling or connection, etc. associated with that DSC. In general, while a common reference may be used generally to show a DSC or multiple instantiations of a DSC within a given embodiment, diagram, example, etc., note that any particular DSC may be implemented in accordance with any manner as described herein, such as described in U.S. Utility patent application Ser. No. 16/113,379, etc. and/or their equivalents.

Note that certain of the following diagrams show one or more processing modules. In certain instances, the one or more processing modules is configured to communicate with and interact with one or more other devices including one or more of DSCs, one or more components associated with a DSC, input electric power, and/or one or more other components. Note that any such implementation of one or more processing modules may include integrated memory and/or be coupled to other memory. At least some of the memory stores operational instructions to be executed by the one or more processing modules. In addition, note that the one or more processing modules may interface with one or more other devices, components, elements, etc. via one or more communication links, networks, communication pathways, channels, etc.

In addition, when a DSC is implemented to communicate with and interact with another element, the DSC is configured simultaneously to transmit and receive one or more signals with the element. For example, a DSC is configured simultaneously to sense and to drive one or more signals to the one element. During transmission of a signal from a DSC, that same DSC is configured simultaneously to sense the signal being transmitted from the DSC and any other signal may be coupled into the signal that is being transmitted from the DSC.

Figure 14:
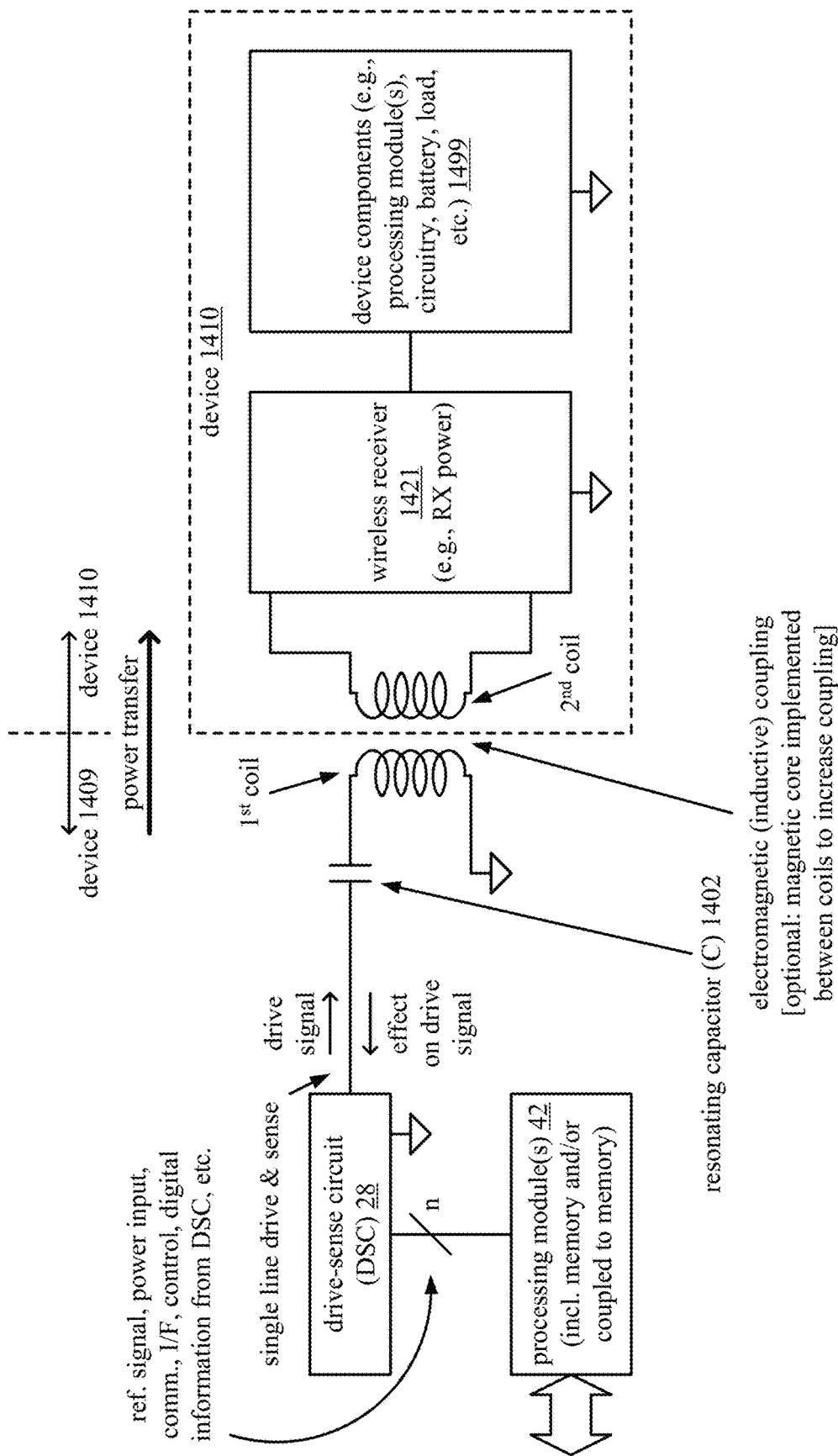
FIG. 14 is a schematic block diagram of an embodiment of various devices including a device that is operative to transfer power wirelessly in accordance with the present invention.

FIG. 14 is a schematic block diagram of an embodiment 1400 of various devices including a device 1409 that is operative to transfer power wirelessly in accordance with the present invention. As with many diagram herein, this diagram shows one or more processing modules 42 configured to interact with a drive-sense circuit (DSC) 28. Note that the coupling or connection between one or more processing modules 42 and the DSC 28 may be made using any number of communication channels, pathways, etc. (e.g., generally n, where n is a positive integer greater than or equal to 1). Examples of one or more signals that may be provided from the one or more processing modules 42 to the DSC may include any one or more of the reference signal (e.g., referred to as Vref in certain diagrams), power input, communication signaling, interfacing, control signaling, digital information provided from the DSC 28, digital information provided from the one or more processing modules 42, etc. In some examples, the DSC 28 itself includes a signal generator whose operation is controlled by the one or more processing modules 42 such as setting one or more parameters of the reference signal to be generated and used as a basis to generate the drive signal.

The DSC 28 is implemented to generate a drive signal based on a reference signal into provided via a single line through a resonating capacitor 1402 to a first coil. The first coil is operative to facilitate electromagnetic (inductive) coupling with a second coil when the first clone the second coil or within sufficient proximity to do so. Generally speaking, the efficacy of electromagnetic coupling between the first coil the second coil is a function of the proximity between the first coil and the second coil. For example, consider the spacing between the first coil and the second coil to be separated by a distance that is inadequate to facilitate electromagnetic (inductive) coupling between the first coil and the second coil, then there will be very little electromagnetic (inductive) coupling. However, when the first coil and the second coil are within sufficient proximity such as to facilitate electromagnetic (inductive) coupling, then energy, power, signals, etc. may be transferred between the first coil the second coil, and vice versa.

In some examples, note that a magnetic core may be implemented in such a way as to increase the efficacy of the electromagnetic (inductive) coupling between the first and second coil. For example, such a magnetic core may be implemented within one or both of the devices 1409 and 1410 that include the first coil and the second coil if desired in certain examples.

In this diagram, consider the first coil included in a first device 1409 that includes and/or is associated with the DSC 28, the resonating capacitor 1402, and the one or more processing modules 42, and consider the second coil included in the second device 1410 that includes a wireless receiver 1421 that is operative to receive power coupled from the first coil to the second coil, and that also includes one or more other device components 1499. Examples of such device components may include any one or more of one or more processing modules, circuitry, battery, load, etc. as may be found in any of a number of different types of devices. Examples of the device 1410 may include any one or more of a laptop computer, a cell phone, an electronic pad device, a personal digital assistant, a portable music devices, a portable media players, a tablet, a digital camera, and/or any other type of device. In certainties and both of the device 1410, the device 1410 includes a battery that is charged via wireless power transfer from the first coil to the second coil after having undergone processing via the wireless receiver 1421. In some examples, the wireless receiver 1421 is operative to generate a DC signal from an AC signal that is provided wirelessly from the first coil to the second coil.

Generally speaking, energy is transferred from the first coil to the second coil when a time varying signal, such as an AC signal, is provided to the first coil. The time varying excitation facilitates electromagnetic (inductive) coupling of the first coil second coil. For example, a time varying excitation signal provided to the first coil will induce a voltage in the second coil. Considering transformer theory as applied to electromagnetic (inductive) coupling between the first coil the second coil, consider that the first coil has a first number of turns, N1, and the second coil has a second number of turns, N2, then a time varying voltage, v1(t), applied across the first coil will induce a time varying voltage, v2(t), across the second coil based on the relationship of:

$$v2(t)=(N1/N1)v1(t)$$

As mentioned above, while a magnetic core may be implemented to increase the efficacy of the electromagnetic (inductive) coupling between the first and second coil, it is not required. In addition, considering transformer theory in an ideal situation, consider two coils that are implemented such as to facilitate electromagnetic (inductive) coupling between them, and assuming perfect flux linkage between the two coils, then the mutual inductance, M, between them may be provided as follows:

$$M=(\mu_0 \times N1 \times N2 \times A)/l \text{ in Henries, where}$$

$\mu_0$ is the permeability of free space, approx. $4\pi \times 10^{-7}$ H/m
N1 has a first number of turns in the first coil
N2 has a second number of turns in the second coil
A is the cross-sectional area of electromagnetic (inductive) coupling between the first coil and the second coil in square meters (m²)
l is the length of the first and second coils in meters (m), assuming same length in this example.

Considering an example in which an iron core is implemented to facilitate greater electromagnetic (inductive) coupling between the first coil and second coil, then then the mutual inductance, M, between them may be provided as follows:

$$M=(\mu_0 \times \mu_r \times N1 \times N2 \times A)/l \text{ in Henries, where}$$

$\mu_0$ is the permeability of free space, approx. $4\pi \times 10^{-7}$ H/m
$\mu_r$ is the relative permeability of the iron core in H/m
N1 has a first number of turns in the first coil
N2 has a second number of turns in the second coil
A is the cross-sectional area of electromagnetic (inductive) coupling between the first coil and the second coil in square meters (m²)
l is the length of the first and second coils in meters (m), assuming same length in this example.

Note that such examples consider an ideal amount of electromagnetic (inductive) coupling between the first coil and the second coil. However, in a real life implementation, there will be some loss due to leakage and imperfect positioning of the first coil relative to the second coil. As such, the electromagnetic (inductive) coupling between the first coil and the second coil will never be perfect or 100% effective, but proper arrangement of the first coil and the second coil can increase the efficacy of the electromagnetic (inductive) coupling, including ensuring that the first coil and the second coil are within sufficient proximity such as to facilitate electromagnetic (inductive) coupling. In some instances, a scale factor, k, is used to represent the actual mutual inductance between the first coil and the second coil as a function of an ideal mutual inductance, such that $M=k \times M_{ideal}$. In some instances, two coils that are perfectly coupled will have a scale factor of k=1; a scale factor of k>0.5 may be associated with tightly coupled coils, and a scale factor of k<0.5 may be associated with loosely coupled coils.

Using a DSC 28 as described herein, any of one or more electrical characteristics associated with the drive signal is provided via the single line and via the resonating capacitor 1402 the first coil may be sensed/detected via the single line simultaneously/concurrently as the drive signal is provided from the DSC 28.

In an example of operation and implementation, the first coil is included within a device 1409 that is operative to transfer power wirelessly to a second coil included in device 1401. The device 1409 includes a DSC 28, memory that stores operational instructions, and one or more processing modules 42 operably coupled to the DSC and the memory (or alternatively, the one or more processing modules 42 includes the memory). The DSC 28 is operably coupled to receive a reference signal and to generate a drive signal based on the reference signal. When enabled, the DSC operably coupled and configured to provide the drive signal to a first coil via a single line and via a resonating capacitor 1402 and simultaneously to sense the drive signal via the single line. Based on the first coil being in a proximity to a second coil associated with another device 1410-1 that facilitates electromagnetic coupling between the first coil and the second coil, the drive signal is operative to transfer power wirelessly from the first coil to the second coil. In addition, the DSC 28 is configured to perform sensing of the drive signal via the single line that includes detection of one or more electrical characteristics of the drive signal. The DSC 28 is configured to generate a digital signal representative of the one or more electrical characteristics of the drive signal based on an error signal corresponding to a difference between the drive signal and the reference signal.

The one or more processing module, when enabled, is configured to execute the operational instructions to generate the reference signal and to process the digital signal representative of the one or more electrical characteristics of the drive signal to determine the one or more electrical characteristics of the drive signal.

In some examples, the one or more processing modules 42 is also configured to adapt at least one parameter of the reference signal based on the one or more electrical characteristics of the drive signal. Examples of the at least one parameter of the reference signal may include any one or more of a magnitude, a frequency, a signal type, a waveform type, or a phase. In some examples, the one or more processing modules 42 is configured to generate the reference signal as a sinusoidal signal. Also, in certain examples, the one or more processing modules 42 is configured to adapt an amplitude of the reference signal based on the one or more electrical characteristics of the drive signal to maximize the error signal. In addition, in some examples, the one or more processing modules 42 is configured to generate the reference signal to have a frequency that is based on a resonant frequency associated with an inductance of the first coil and a capacitance of the resonating capacitor.

In an alternative example of operation and implementation, the first coil is included within a device 1409 that is operative to transfer power wirelessly to a second coil included in another device 1410. The device 1409 includes a DSC 28, memory that stores operational instructions, and one or more processing modules 42 operably coupled to the DSC and the memory (or alternatively, the one or more processing modules 42 includes the memory). The DSC 28 is operably coupled to receive a reference signal and to generate a drive signal based on the reference signal. When enabled, the DSC operably coupled and configured to provide the drive signal to a first coil via a single line and via a resonating capacitor 1402 and simultaneously to sense the drive signal via the single line. Based on the first coil of the device 1409 being in a proximity to a second coil associated with another device 1410 that facilitates electromagnetic coupling between the first coil and the second coil, the drive signal is operative to transfer power wirelessly from the first coil to the second coil. In addition, the DSC 28 is configured to perform sensing of the drive signal via the single line that includes detection of one or more electrical characteristics of the drive signal. the DSC 28 is configured to generate a digital signal representative of the one or more electrical characteristics of the drive signal based on an error signal corresponding to a difference between the drive signal and the reference signal.

The one or more processing modules 42, when enabled, is configured to execute the operational instructions to generate the reference signal and process the digital signal representative of the one or more electrical characteristics of the drive signal to determine the one or more electrical characteristics of the drive signal including to determine whether a signal associated with the other device 1410 is coupled into the drive signal thereby indicating presence of the other device 1410 within the proximity to the device 1409 that facilitates electromagnetic coupling between the first coil and the second coil. Note that the electromagnetic (inductive) coupling between the first coil and the second coil, and the functionality and operation of the DSC 28, facilitates detection of the presence of one or more additional signals including any other signal may be coupled into the first coil.

For example, as the device 1410 is in operation, it may generate one or more signals that may be detected and coupled into the first coil. From certain perspectives, the first coil may be viewed as operating as a component (e.g., an antenna, an electrode, etc.) that facilitates the coupling of one or more signals generated by the device 1410 as it is in operation. Certain examples of such signals may include interaction of the device 1410 with another device in communication (e.g., consider the device 1410 is a cellular telephone communicating with a cellular tower/base station, or alternatively that the device 1410 is a cellular telephone or consider the device 1410 is a laptop computer communicating with a Wi-Fi hotspot, etc.). The one or more processing modules 42 is configured to perform detection of any such one or more additional signals associated with a device 1410 that is appropriate for wireless transfer of power via the first coil to the second coil to validate the presence of such a device that is appropriate for wireless transfer of power. For example, based on determination that a signal associated with the other device 1410 is coupled into the drive signal, the one or more processing modules 42 is configured to continue to provide the reference signal to the DSC 28 to facilitate wireless power transfer from the first coil to the second coil in accordance with charging of a battery of the other device 1410.

However, based on determination that no signal associated with the other device 1410 is coupled to the drive signal, the one or more processing modules 42 is configured to perform one or more alternative functions. In one example, the one or more processing modules 42 is configured to adjust an amplitude of the reference signal to zero to stop the DSC 28 from providing the drive signal to the first coil via the single line in via the resonating capacitor 1402. For example, consider a determination that no signal associated with any such other device 1410 that is appropriate for wireless transfer of power is coupled into the drive signal, then the one or more processing modules 42 is configured to detect that no such other device 1410 that is appropriate for wireless transfer of power is present, and the one or more processing modules 42 executes one or more appropriate actions. In one example, this involves cessation of providing the drive signal from the DSC 28.

Note that operation may resume subsequently to determine whether or not another device 1410 that is appropriate for wireless transfer of power is within sufficient proximity to the device that includes the first coil (e.g., by once again providing of a reference signal from the one or more processing modules 42, by once again the providing of a drive signal from the DSC 28, etc.). Based on the determination that such a device 1410 that is appropriate for wireless transfer power is present, the one or more processing modules 42 is configured to continue to provide the reference signal to the DSC to facilitate wireless power transfer from the first coil to the second coil in accordance with charging of a battery of the other device 1410.

Figure 15:
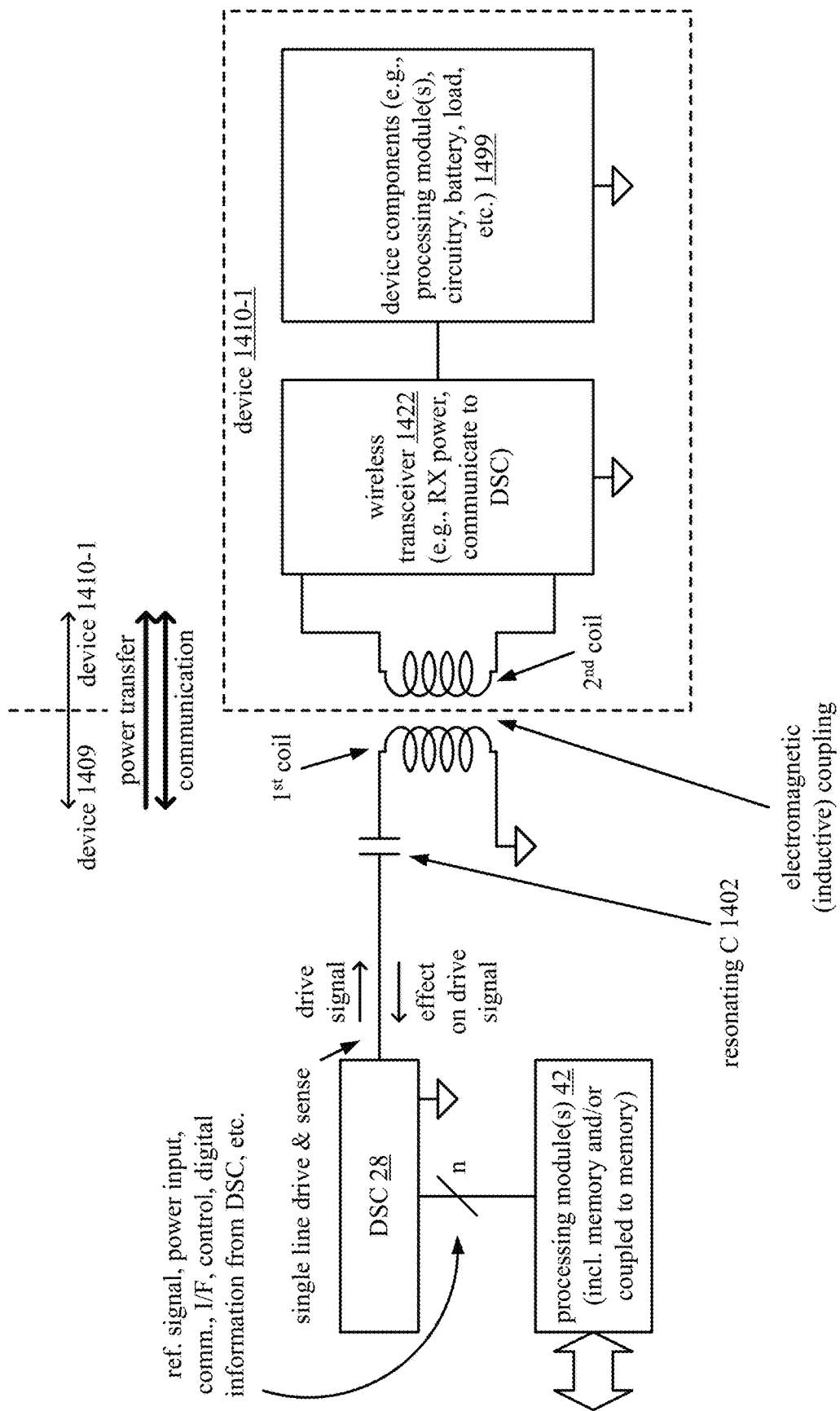
FIG. 15 is a schematic block diagram of an embodiment of various devices including a device that is operative to transfer power and communicate wirelessly in accordance with the present invention.

FIG. 15 is a schematic block diagram of an embodiment 1500 of various devices including a device 1409 that is operative to transfer power and communicate wirelessly in accordance with the present invention. This diagram has certain similarities to the previous diagram with at least one difference being that the wireless transceiver 1422 is implemented within a device 1410-1 that includes a second coil. This wireless transceiver 1422 is operative not only to receive power wirelessly from the device 1409 that includes the first coil, but is also operative to facilitate communication with that other device 1409 via the electromagnetic (inductive) coupling between the first coil and the second coil. For example, the wireless transceiver 1422 is operative not only to receive power that is provided via a drive signal provided from the DSC 28 via the single line via the resonating capacitor 1402 and the electromagnetic (inductive) coupling between the first coil and the second coil, but is also operative to receive one or more communication signals from the DSC 28 via that same pathway and also to transmit one or more communication signals to the DSC 28 via that same pathway. This diagram shows an example by which communication is supported from one device (e.g., device 1409) that includes the first coil and also from a second device that includes a second coil (e.g., device 1410-1).

In an example of operation and implementation, the first coil is included within a device 1409 that is operative to transfer power and communicate wirelessly. The device 1409 includes a DSC 28, memory that stores operational instructions, and one or more processing modules 42 operably coupled to the DSC and the memory (or alternatively, the one or more processing modules 42 includes the memory).

When enabled, the DSC 28 is operably coupled and configured to provide the drive signal to a first coil via a single line and via a resonating capacitor 1402 and simultaneously to sense the drive signal via the single line. Based on the first coil being in a proximity to a second coil associated with another device 1410-1 that facilitates electromagnetic coupling between the first coil and the second coil, the drive signal is operative to transfer power wirelessly from the first coil to the second coil. The DSC 28 is also configured to perform sensing of the drive signal via the single line that includes detection of one or more electrical characteristics of the drive signal including detection of whether a communication signal is transmitted from the other device 1410-1 to the device 1409 via the electromagnetic coupling between the first coil and the second coil. In this diagram, note that the device 1410-1 includes a wireless transceiver 1422 that is operative to transmit one or more signals via the second coil that is coupled into the first coil and that may be detected by the DSC 28.

The DSC 28 is also configured to generate a digital signal representative of the one or more electrical characteristics of the drive signal based on an error signal corresponding to a difference between the drive signal and the reference signal.

When enabled, the one or more processing modules 42 is configured to execute the operational instructions to generate the reference signal and to process the digital signal representative of the one or more electrical characteristics of the drive signal to determine the one or more electrical characteristics of the drive signal including to determine whether the communication signal is transmitted from the other device 1410-1 to the device 1409 via the electromagnetic coupling between the first coil and the second coil.

Based on determination that the communication signal is transmitted from the other device 1410-1 to the device 1409 that includes the first coil, the one or more processing modules 42 is configured to process the digital signal to interpret control information from the communication signal. The one or more processing modules 42 is configured to execute one or more operations based on the control information that is interpreted. For example, in one example, the one or more processing modules 42 is configured to adapt at least one parameter of the reference signal based on the control information. Examples of the at least one parameter of the reference signal may include any one or more of a magnitude, a frequency, a signal type, a waveform type, or a phase.

Alternatively, based on determination that no communication signal is transmitted from the other device 1410-1 to the device 1409, the one or more processing modules 42 is configured to execute one or more operations. In some examples, the one or more processing modules 42 is configured to adjust an amplitude of the reference signal to zero to stop the DSC from providing the drive signal to the first coil via the single line and via the resonating capacitor.

In some examples, based on determination that the communication signal is transmitted from the another device to the device, the one or more processing modules 42 is configured to continue to provide the reference signal to the DSC to facilitate wireless power transfer from the first coil to the second coil in accordance with charging of a battery of the another device (e.g., a battery included in device 1410-1). Note that the communication signal includes information indicating presence of the another device within the proximity to the device that facilitates electromagnetic coupling between the first coil and the second coil.

In even other examples, the one or more processing modules 42 is configured to process the digital signal representative of the one or more electrical characteristics of the drive signal to determine the one or more electrical characteristics of the drive signal including to determine whether another communication signal is transmitted from the another device to the device via the electromagnetic coupling between the first coil and the second coil. Based on determination that the another communication signal is transmitted from the another device to the device, the one or more processing modules 42 is configured to process the digital signal to interpret additional control information from the another communication signal. Also, based on determination that the additional control information indicates a charged status of a battery of the another device, the one or more processing modules 42 is configured to adjust an amplitude of the reference signal to zero to stop the DSC from providing the drive signal to the first coil via the single line and via the resonating capacitor.

In an alternative example of operation and implementation, the first coil is included within a device 1409 that is operative to transfer power and communicate wirelessly. The device 1409 includes a DSC 28, memory that stores operational instructions, and one or more processing modules 42 operably coupled to the DSC and the memory (or alternatively, the one or more processing modules 42 includes the memory).

When enabled, the DSC 28 is operably coupled to receive a reference signal and to generate a drive signal based on the reference signal. When enabled, the DSC operably coupled and configured to provide the drive signal to a first coil via a single line and via a resonating capacitor 1402 and simultaneously to sense the drive signal via the single line. Based on the first coil being in a proximity to a second coil associated with another device 1410-1 that facilitates electromagnetic coupling between the first coil and the second coil, the drive signal is operative to transfer power wirelessly from the first coil to the second coil. The DSC is also configured to perform sensing of the drive signal via the single line includes detection of one or more electrical characteristics of the drive signal including detection of whether a communication signal is transmitted from the other device 1410-1 to the device 1409 via the electromagnetic coupling between the first coil and the second coil. In this diagram, note that the device 1410-1 includes a wireless transceiver 1422 that is operative to transmit one or more signals via the second coil that is coupled into the first coil and that may be detected by the DSC 28. The DSC 28 is also configured to generate a digital signal representative of the one or more electrical characteristics of the drive signal based on an error signal corresponding to a difference between the drive signal and the reference signal.

The DSC 28 is also configured to generate a digital signal representative of the one or more electrical characteristics of the drive signal based on an error signal corresponding to a difference between the drive signal and the reference signal.

When enabled, the one or more processing modules 42 is configured to execute the operational instructions to generate the reference signal. The one or more processing modules 42 is also configured to process the digital signal representative of the one or more electrical characteristics of the drive signal to determine the one or more electrical characteristics of the drive signal including to determine whether the communication signal is transmitted from the other device 1410-1 to the device 1409 via the electromagnetic coupling between the first coil and the second coil.

Based on determination that the communication signal is transmitted from the other device 1410-1 to the device 1409, the one or more processing modules 42 is also configured to continue to provide the reference signal to the DSC to facilitate wireless power transfer from the first coil to the second coil in accordance with charging of a battery of the other device 1410-1. Note that the communication signal includes information indicating presence of the other device 1410-1 within the proximity to the device 1409 that facilitates electromagnetic coupling between the first coil and the second coil.

Also, in certain other examples, the one or more processing modules 42 is also configured process the digital signal representative of the one or more electrical characteristics of the drive signal to determine the one or more electrical characteristics of the drive signal including to determine whether another communication signal is transmitted from the another device to the device via the electromagnetic coupling between the first coil and the second coil. Based on determination that the another communication signal is transmitted from the another device to the device, the one or more processing modules 42 is also configured to process the digital signal to interpret additional control information from the another communication signal. Based on determination that the additional control information indicates a charged status of a battery of the another device, the one or more processing modules 42 is also configured to adjust an amplitude of the reference signal to zero to stop the DSC from providing the drive signal to the first coil via the single line and via the resonating capacitor.

In even other examples, the one or more processing modules 42 is also configured to process the digital signal representative of the one or more electrical characteristics of the drive signal to determine the one or more electrical characteristics of the drive signal including to determine whether another communication signal is transmitted from the another device to the device via the electromagnetic coupling between the first coil and the second coil. Based on determination that the another communication signal is transmitted from the another device to the device, the one or more processing modules 42 is also configured to process the digital signal to interpret additional control information from the another communication signal. Based on determination that the additional control information includes an instruction from the another device to adapt at least one parameter of the reference signal, adapt the at least one parameter of the reference signal based on the instruction. Note that the at least one parameter of the reference signal may include any one or more of a magnitude, a frequency, a signal type, a waveform type, or a phase.

Figure 16:
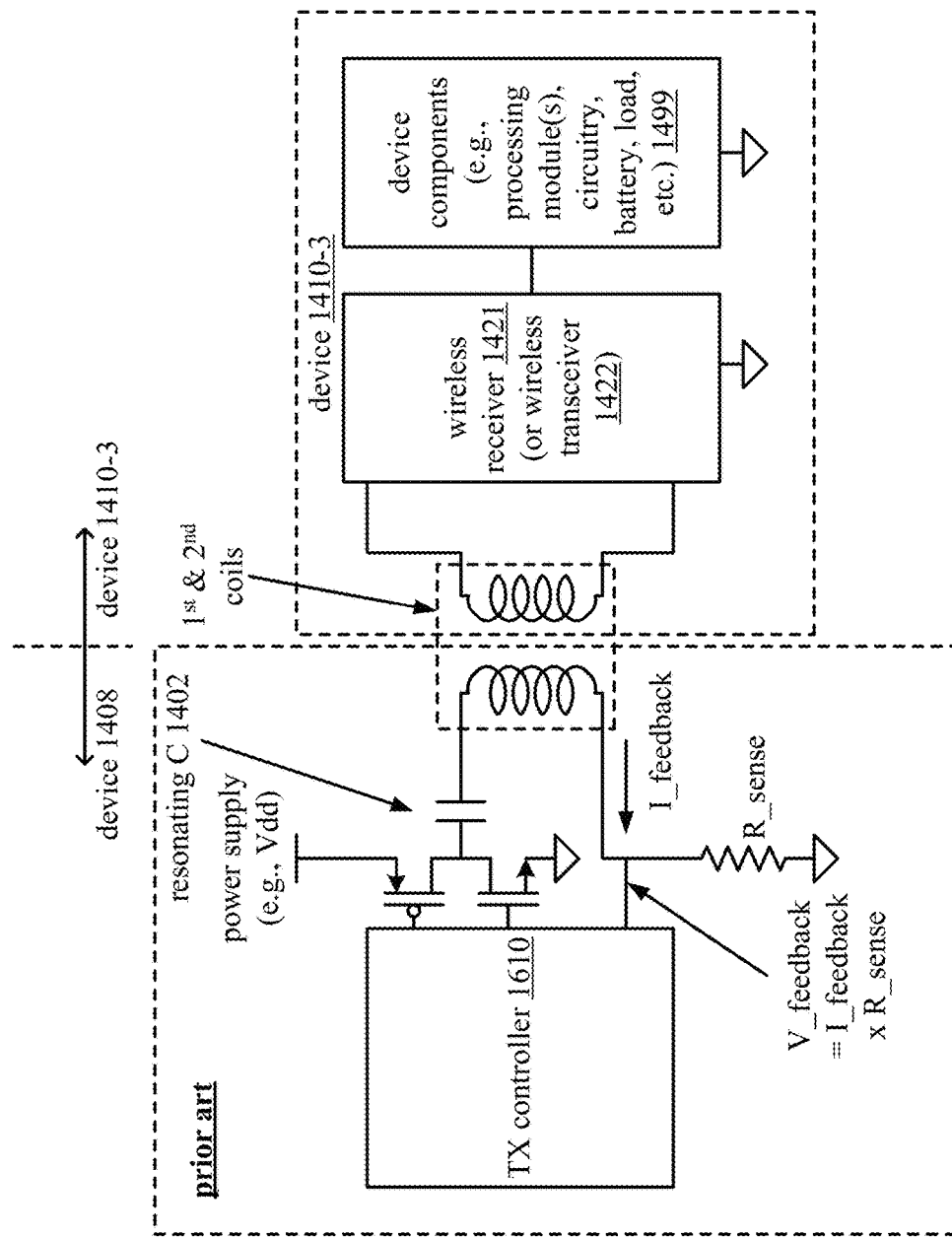
FIG. 16 is a schematic block diagram of an embodiment of various devices including a prior art device that is operative to transfer power wirelessly in accordance with the present invention.

FIG. 16 is a schematic block diagram of an embodiment 1600 of various devices including a prior art device 1408 that is operative to transfer power wirelessly in accordance with the present invention. This diagram has some similarities to other diagrams herein with at least one difference being that the first coil is included within a prior art device 1408. In addition, note that the second coil is included within a device 1410-3 that may be implemented to include a wireless receiver 1421 and/or a wireless transceiver 1422 as described herein. In addition, one or more additional device components 1499 are also included within the device 1410-3 as described herein.

In this diagram, a prior art device 1408 includes a transmit controller 1610 that is operative to generate a square wave to be provided via switching transistors such as MOSFETs (e.g., such as shown a P-type MOSFET as being connected to a power supply (e.g., Vdd) and an and-type MOSFET as having a source connected to ground. The transmit controller 1610 is operative to control the switching of the gates of these MOSFETs to generate a square wave AC signal that is provided via the resonating capacitor 1402 to the first coil. In addition, note that a sensing resistor, R_sense, is coupled to the other end of the first coil so as to be able to detect a feedback signal, I_feedback, as may be provided from a wireless transceiver 1422 to the prior art device 1408 that includes the first coil. In such a prior art implementation, note that the value of a sensing resistor, R_sense, needs to be scaled appropriately to be able to handle the full amount of current that may be provided to the first coil. Based on current passing through the sensing resistor, R_sense, a voltage is generated, V_feedback, and is detected by the transmit controller 1610.

Note that various embodiments, examples, etc. included herein and their equivalents, obviates the need for any such sensing resistor, R_sense, at least in part, because of the operation of a DSC 28. In such a prior art implementation, the sensing resistor, R_sense, can cause excessive heating within a the prior art device 1408 that includes the first coil. Instead, implementing a device in accordance with various aspects, embodiments, and/or examples of the invention (and/or their equivalents) as described herein obviates the need for any such sensing resistor, R_sense, thereby providing a number of benefits and improvements over the prior art including a reduction in number of components and a reduction in amount of heating.

In addition, in certain embodiments, examples, etc. included herein and their equivalents, the reference signal and drive signal may be sinusoidal of a pure tone nature, such as having a singular frequency. Other examples may include signals having multiple frequency is there in. Considering a sinusoidal signal of the pure tone nature, such as having a singular frequency, no harmonics are generated as may unfortunately be generated using the switching transistors included within such a prior art device 1408. In general, note that the reference signal as described herein to be used within a DSC may have any form (e.g., sinusoidal, square wave, triangle wave, etc.). If desired, and architecture such as the switching transistors included within the diagram could be used to generate a reference signal to be used within a DSC.

Figure 17:
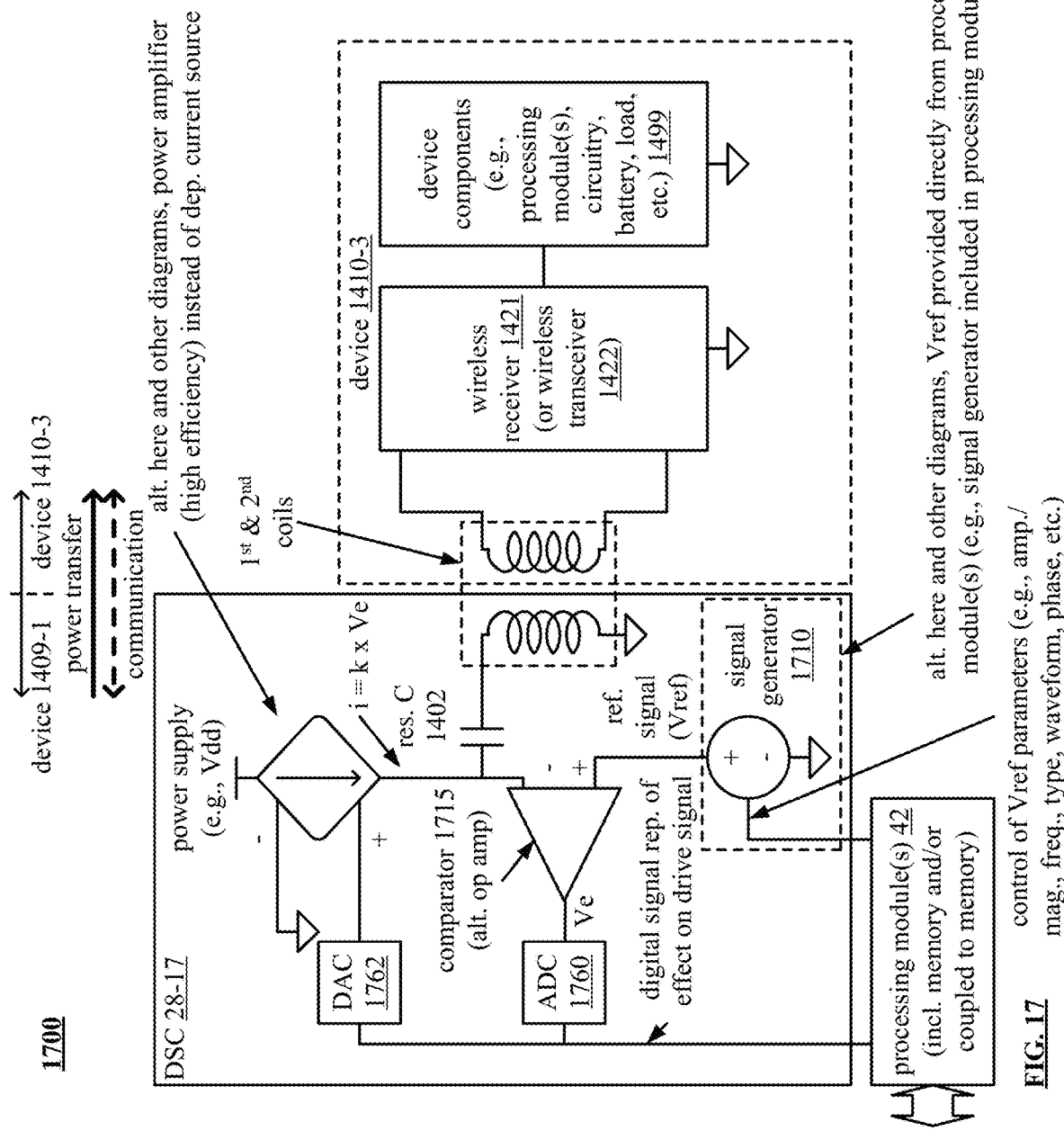
FIG. 17 is a schematic block diagram of an embodiment of various devices including a device that is operative to transfer power wirelessly and/or transfer power and communicate wirelessly in accordance with the present invention.

FIG. 17 is a schematic block diagram of an embodiment 1700 of various devices including a device 1409-1 that is operative to transfer power wirelessly and/or transfer power and communicate wirelessly in accordance with the present invention. This diagram also has some similarities to other diagrams herein such that the second coil is included with the device 1410-3 that may be implemented to include a wireless receiver 1421 and/or a wireless transceiver 1422 as described herein.

This diagram also provides an alternative implementation by which a DSC 28 may be implemented, as shown by DSC 28-17. As with other embodiments, examples, etc. herein, one or more processing modules 42 is implemented to interact and communicate with the DSC 28-17 in this diagram. The DSC 28-17 includes a signal generator 1710 that is configured to receive a control signal from the one or more processing modules 42 that specifies one or more parameters of the reference signal. Examples of one or more parameters of the reference signal may include any one or more of amplitude/magnitude, frequency, type, waveform, phase, etc. Note that the reference signal may include more than one frequency. In addition, note that the reference signal may be of any desired type and having any desired waveform. For example, in some examples, the reference signal is a sinusoidal signal. However, note that the reference signal may be any other type of signal including square wave signal, triangle wave signal, sawtooth signal, etc., as just some examples of types and waveforms of signals.

In addition, in this diagram as well as others that pictorially show a signal generator 1710, note that any alternative examples may exclude such a signal generator 1710 within such as implementation of a DSC, and the one or more processing modules 42 may be configured to provide the reference signal directly to the DSC. For example, the one or more processing modules 42 may include functionality of such a signal generator 1710 therein and the functionality to generate a reference signal having any such desired parameters.

The reference signal is provided to an input of a comparator 1715, which may alternatively be implemented as an operational amplifier. Another input of the comparator 1715 receives the drive signal that is also provided via the single line via the resonating capacitor 1402 to the first coil. The drive signal is generated by a dependent current supply that is powered by a power supply (e.g., Vdd) and that is controlled based on an error signal, Ve, that is generated by the comparator 1415 as it compares the drive signal to the reference signal. In this diagram, the error signal is passed through and analog to digital converter (ADC) 1760 to generate a digital signal that is representative of one or more electrical characteristics of the drive signal. The digital signal is provided to the one or more processing modules 42 and also provided to a DAC 1762 to generate an analog control signal that controls the amount of current that is output from the dependent current supply via the single-line. Note that the amount of current, i, that is output from the dependent current supply based on the error signal, Ve, is a function of a programmable scale factor, k, of the dependent current supply such that: $i = k \times Ve$. In certain examples, note also that the one or more processing modules 42 is configured to adjust a programmable gain of the dependent current supply. Note that scaling the programmable gain of the dependent current supply provides for scaling of the error signal, Ve. Control of the current, i, and him that is output from the dependent current supply may be effectuated by appropriate control of the reference signal as well as the programmable gain of the dependent current supply.

In this diagram that shows a dependent current supply, note that a power amplifier, such as a high efficiency power amplifier, may alternatively be implemented in place of such a dependent current source (e.g., as shown in FIG. 25 herein). The control of such a power amplifier may be effectuated in a similar manner based on the error signal, Ve, that is generated by the comparator 1415 as it compares the drive signal to the reference signal.

Figure 18:
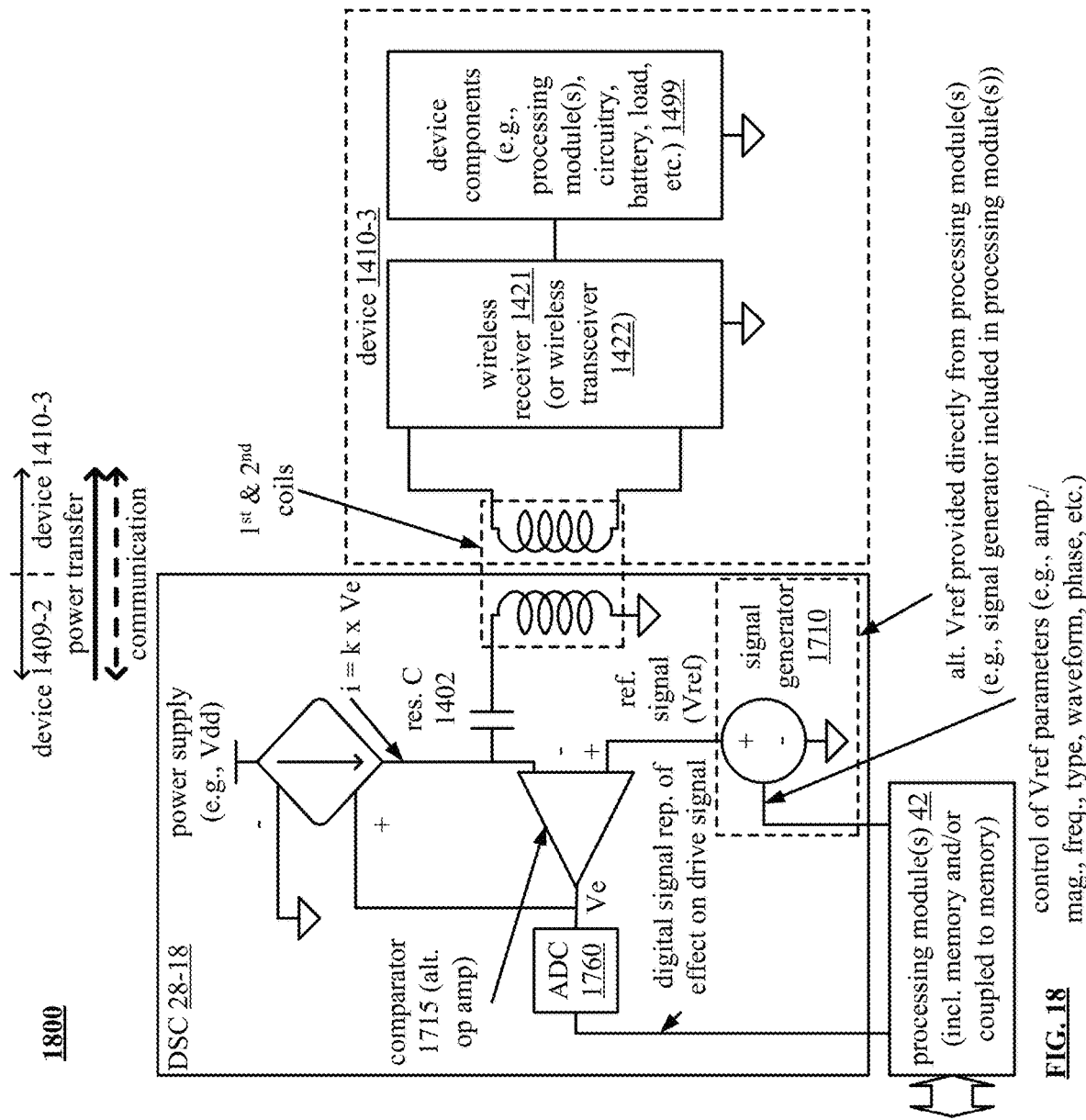
FIG. 18 is a schematic block diagram of another embodiment of various devices including a device that is operative to transfer power wirelessly and/or transfer power and communicate wirelessly in accordance with the present invention.

FIG. 18 is a schematic block diagram of another embodiment 1800 of various devices including a device 1409-2 that is operative to transfer power wirelessly and/or transfer power and communicate wirelessly in accordance with the present invention. This diagram is similar to the prior diagram with at least one difference being that a DSC 28-18 employs an analog control signal that controls the amount of current that is output from the dependent current supply via the single-line is provided directly based on the error signal, Ve, that is generated from the comparator 1715. Note that this diagram does not include or require the DAC 1762 as shown in the prior diagram.

Figure 19:
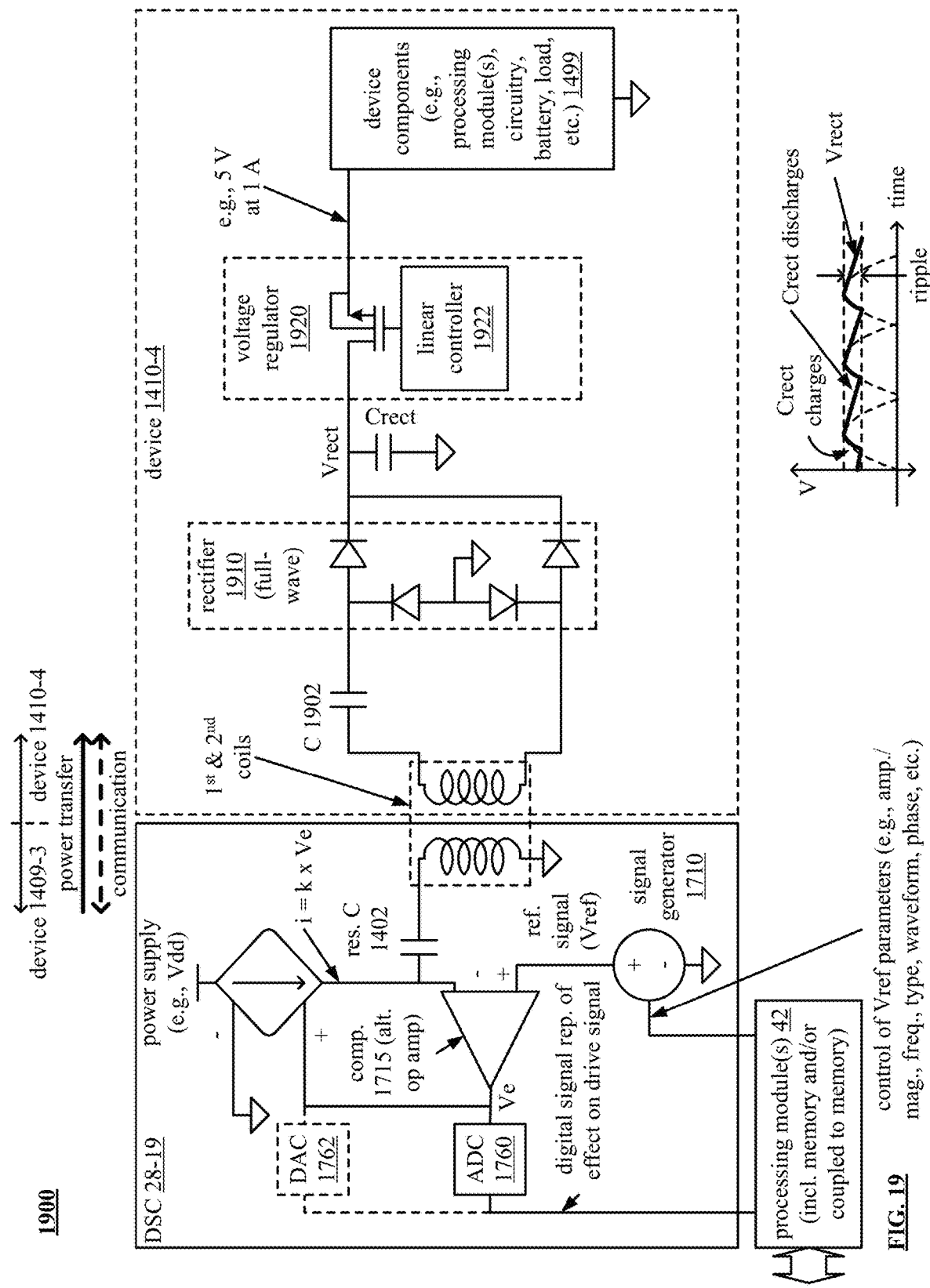
FIG. 19 is a schematic block diagram of another embodiment of various devices including a device that is operative to transfer power wirelessly and/or transfer power and communicate wirelessly in accordance with the present invention.

FIG. 19 is a schematic block diagram of another embodiment 1900 of various devices including a device 1409-3 that is operative to transfer power wirelessly and/or transfer power and communicate wirelessly in accordance with the present invention. This diagram is similar to the prior two diagrams with at least one difference being that a DSC 28-19 is shown as employing an analog control signal that controls the amount of current that is output from the dependent current supply via the single-line is provided directly based on the error signal, Ve, that is generated from the comparator 1715 or alternatively employing an analog control signal for such purposes as being provided from a DAC 1762 that receives the digital signal output from the ADC 1760. Note that either implementation may be used in various examples. In certain of the following diagrams as well, both such possible implementations are shown.

In this diagram, a device 1410-4 that includes the second coil includes a capacitor 1902 that is connected in line with one of the terminals of the second coil. The two respective terminals of the second coil are provided to a rectifier 1910, which is shown as a full wave rectifier in this example including four respective diodes, which may be implemented as power diodes, and are configured to generate a DC signal from an AC signal that is provided via the two terminals of the second coil. In addition, this DC signal is filtered via a filtering/rectifying capacitor, Crect, to generate a rectified DC voltage, V_rect, and is also passed through a voltage regulator 1920 whose operation is controlled by a linear controller 1922, to generate an output DC signal that is appropriate and suitable for the one or more additional device components 1499 of the device 1410-4. In some examples, this DC signal has a voltage of 5 V at approximately a current of 1 amp. In general, know that appropriate selection of the components of the rectifier 1910, the filtering/rectifying capacitor, Crect, and a voltage regulator 1920 may be made to generate a DC signal having an appropriate and desired voltage and current rating.

The variation of the rectified DC voltage, V_rect, is shown at the bottom right of the diagram as a function of time. As can be seen, the filtering/rectifying capacitor, Crect, is operative to charge and discharge thereby maintaining a DC level within a certain range having a certain level during the charge or discharge of the filtering/rectifying capacitor, Crect. The voltage regulator 1920 is operative to maintain this output DC voltage even further thereby providing substantially constant DC level.

Figure 20:
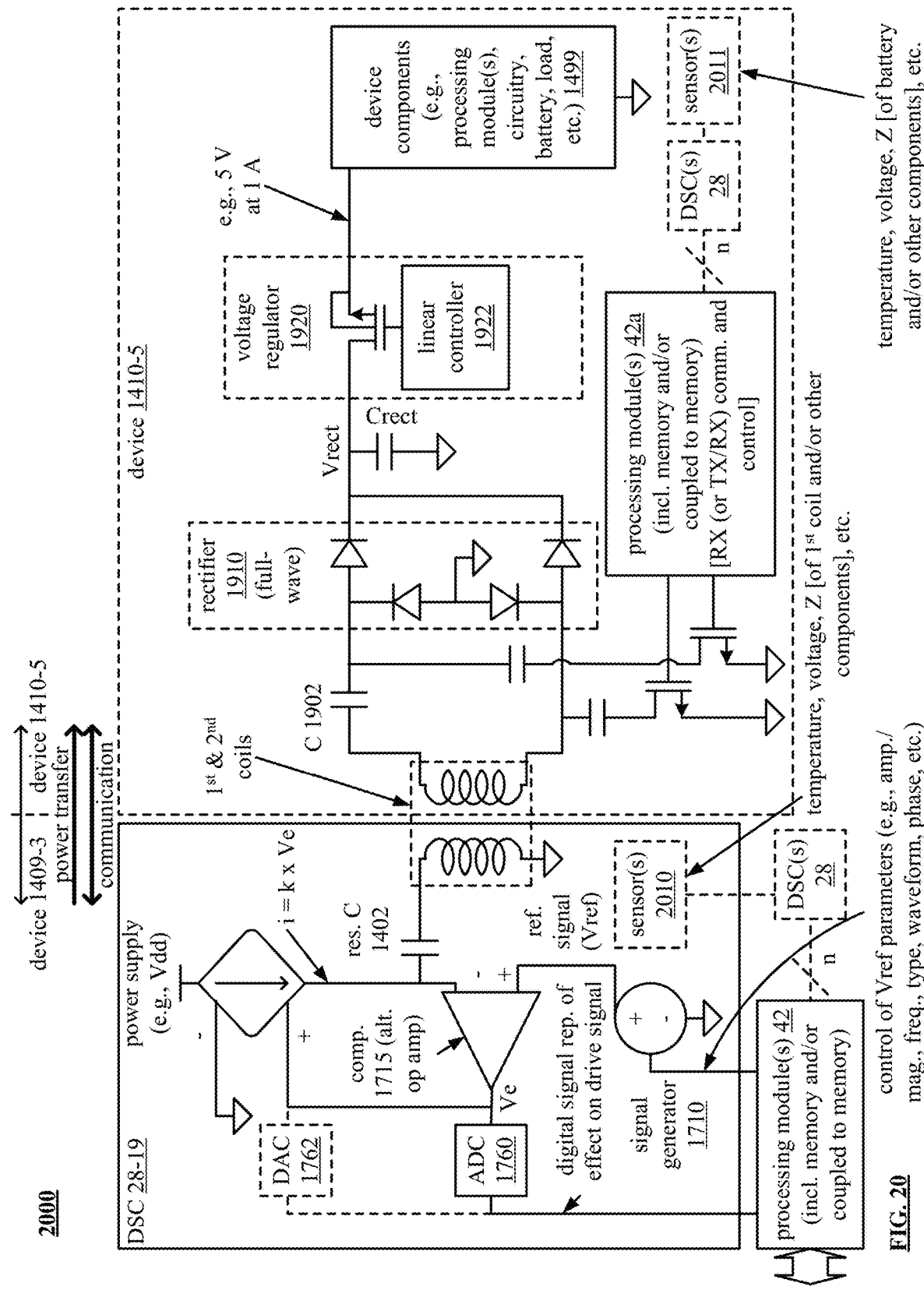
FIG. 20 is a schematic block diagram of another embodiment of various devices including a device that is operative to transfer power and communicate wirelessly in accordance with the present invention.

FIG. 20 is a schematic block diagram of another embodiment 2000 of various devices including a device 1409-3 that is operative to transfer power and communicate wirelessly in accordance with the present invention. This diagram is similar to the previous diagram with at least some difference being that one or more processing modules 42a are included within the device that includes the second coil within device 1410-5. The one or more processing modules 42a are shown as being in communication with the lines coming from the two terminals of the second coil within the device 1410-5 via the two transistors, such as N-type MOSFET transistors, and AC coupling capacitors. The one or more processing modules 42a is operative to facilitate communication to the device 1409-3 that includes the first coil via the second coil and via the transistors and AC coupling capacitors.

The one or more processing modules 42a is operative to facilitate bidirectional communication with the one or more processing modules 42 via the coupling and connectivity between the respective devices that include the first coil and the second coil, respectively. In an example of operation and implementation, the one or more processing modules 42a is operative to provide a communication signal that is detected by a DSC that includes the first coil, such as DSC 28-19. Such a communication signal provided from the one or more processing modules 42a may include a number of different types of information. Some examples, such a communication signal includes information that indicates the presence of the device 1410-5 that includes the second coil and that is suitable for receiving power wirelessly from the device includes a first coil. In other examples, such a communication signal includes information that is used by the device that includes the first coil in accordance with adjustment of one or more parameters of the drive signal. When even other examples, such communication signal includes information regarding status of the battery within a device 1410-5 that includes the second coil. Based on status of the battery within the device 1410-5 that includes the second coil being of a charged status, the information within the communication signal may be used by the device that includes the first coil to stop providing the drive signal. This may be effectuated by the one or more processing modules 42 operating to adjust and amplitude of the reference signal to zero to stop the DSC associated therewith (e.g., DSC 28-19 in this diagram) from providing the drive signal to the first coil via the single-line and via the resonating capacitor 1402.

Generally speaking, any type of communication may be facilitated between the one or more processing modules 42 associated with the first device 1409-3 that includes the first coil and the one or more processing modules 42a associated with the second device 1410-5 that includes the second coil.

In addition, in certain examples, one or more sensors of one or more types may be included within the first device 1409-3 that includes the first coil and/or the second device 1410-5 that includes the second coil. For example, one or more sensors 2010 are implemented within the first device 1409-3 that includes the first coil, and/or one or more sensors 2011 are implemented within the second device 1410-5 that includes a second coil. These one or more sensors 2010 and 2011 are in communication with the respective one or more processing modules 42/42a in the respective devices 1409-3 and 1410-5 that include the first and second coils, respectively. Communication between with the one or more processing modules 42/42a and the one or more sensors 2010 and 2011 may be facilitated via one or more DSCs 28. In some examples, a separate respective DSC 28 is implemented to facilitate communication between the one or more processing modules 42/42a and each respective one of the one or more sensors 2010/2011.

Examples of such sensors 2010 and/or 2011 may include any of a number of types of sensors such as temperature sensors, voltage sensors, impedance sensors (e.g., such as to determine impedance of a battery and/or other components of the device 1410-5 and includes the second coil. For example, a temperature sensor 2010 is implemented in sufficient proximity to the first coil as to detect temperature of another device, such as device 1410-5, when that other device is present and within a sufficient proximity as to facilitate electromagnetic (inductive) coupling between the first coil in the first device 1409-3 and the second coil in the second device 1410-5. In addition, such a temperature sensor 2010 is implemented to monitor temperature during operation of the first device 1409-3 and the second device 1410-5 including wireless power transfer from the first device 1409-3 to the second device 1410-5. The one or more processing modules 42/42a is operative to use information provided by the one of the one or more sensors 2010/2011 to adapt operation of any one or more components within the first device 1409-3/second device 1410-5.

Figure 21:
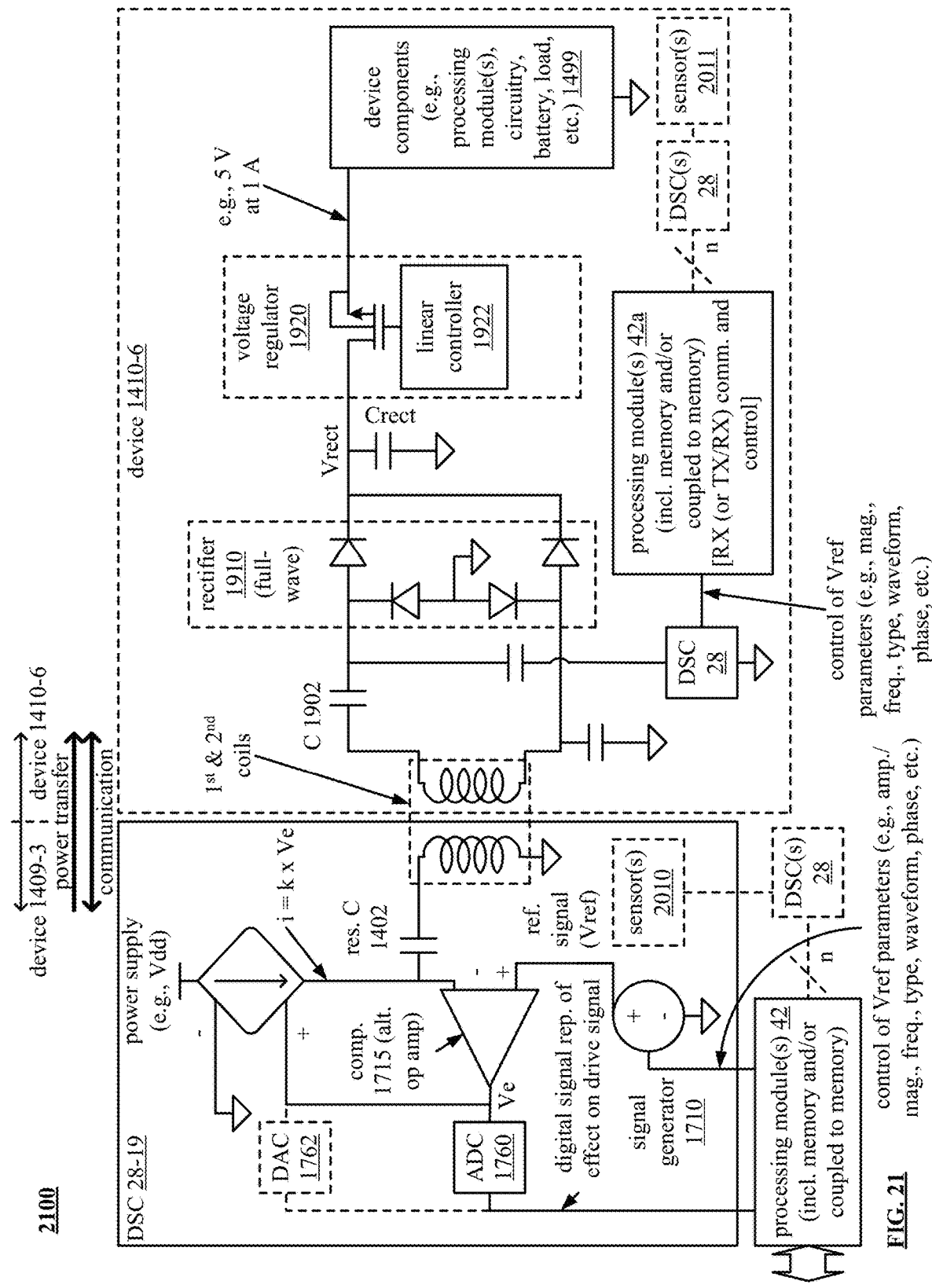
FIG. 21 is a schematic block diagram of another embodiment of various devices including a device that is operative to transfer power and communicate wirelessly in accordance with the present invention.

FIG. 21 is a schematic block diagram of another embodiment 2100 of various devices including a device 1409-3 that is operative to transfer power and communicate wirelessly in accordance with the present invention. This diagram has some similarities to the previous diagram with at least some difference being a device 1410-6 that includes the one or more processing modules 42a is in communication with one of the terminals of the second coil via a DSC 28 and via an AC coupling capacitor. The other terminal of the second coil is coupled to ground via an AC coupling capacitor as well. This implementation facilitates communication between the devices 1409-3 and 1410-6 via another DSC 28 that is implemented within the device 1410-6. Note that the one or more processing modules 42a of the device 1410-6 mini implemented control any of the various parameters associated with the reference signal associated with the DSC 28 that is in communication with one of the terminals of the second coil via an AC coupling capacitor.

Figure 22:
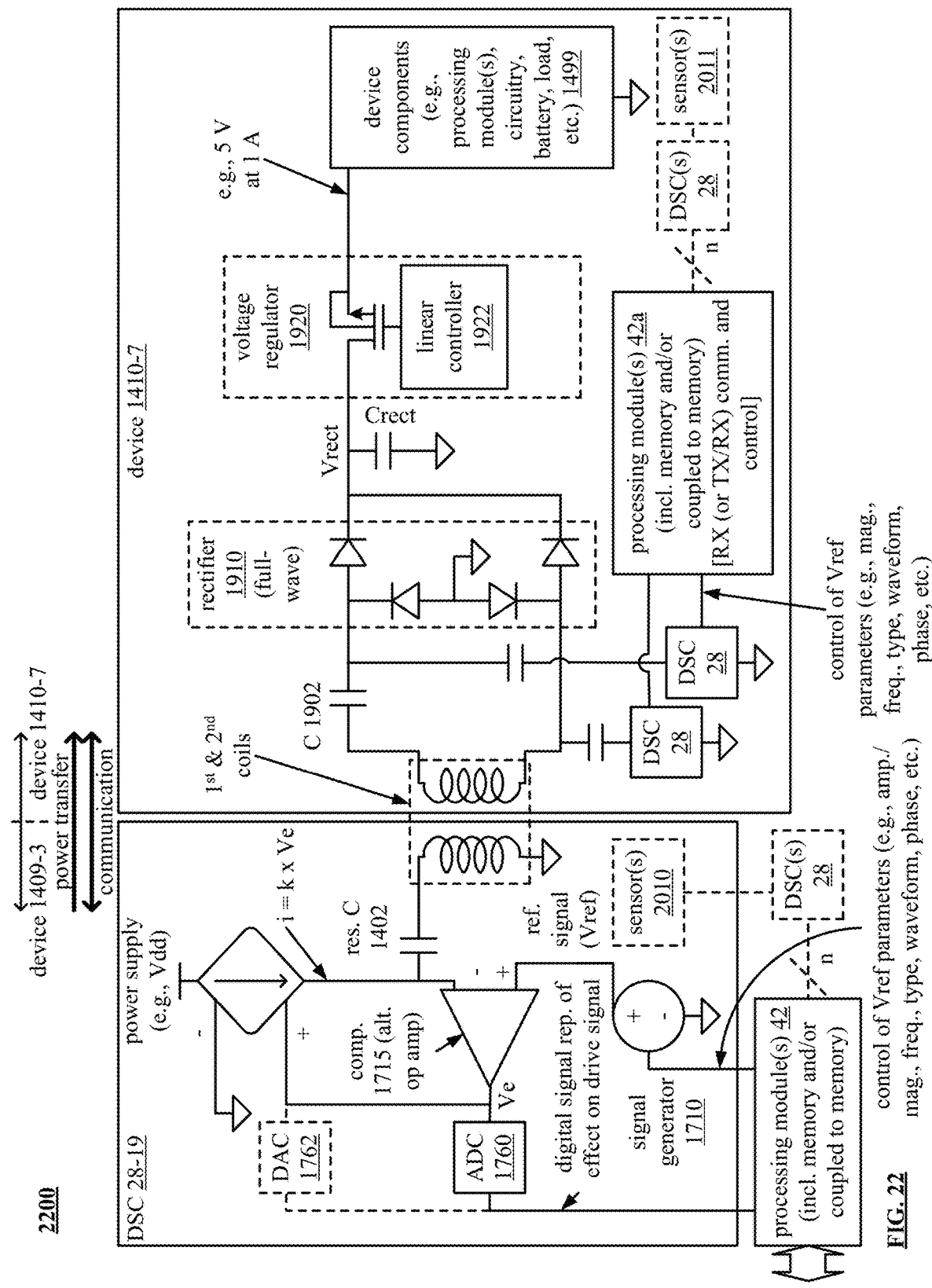
FIG. 22 is a schematic block diagram of another embodiment of various devices including a device that is operative to transfer power and communicate wirelessly in accordance with the present invention.

FIG. 22 is a schematic block diagram of another embodiment 2200 of various devices including a device 1409-3 that is operative to transfer power and communicate wirelessly in accordance with the present invention. This diagram has some similarities to the previous diagram with at least some difference being a device 1410-7 that includes the one or more processing modules 42a is in communication with both of the terminals of the second coil via respective DSCs 28 and via respective AC coupling capacitors. This implementation facilitates communication between the devices 1409-3 and 1410-7 via two additional DSCs 28 that are implemented within the device 1410-7. Note that the one or more processing modules 42a of the device 1410-6 mini implemented control any of the various parameters associated with the reference signals associated with these two additional DSCs 28 that are s in communication with the respective terminals of the second coil via respective AC coupling capacitors.

Certain of the following diagrams provide illustration of change of certain parameters of a battery during charging and/or discharging operations. Note that such illustrations are examples of some possible trends during such operations. For a particular battery of a certain type, construction, composition, etc., such trends may be made based on actual monitoring and tracking of that particular battery during acceptable or normal operation, from information provided from a manufacturer of that particular battery, from information associated with similar types of batteries, and/or other information. For example, considering a new battery, such trends and profiles may be made specifically for that battery during its initial operation to establish a baseline or acceptable range within which the battery is expected to operate. Detection of deviation from that baseline or acceptable range may be used as a basis to identify a problem in charging and/or discharging operations.

In addition, such trends and profiles may be used as a basis or bases to determine whether or not a component within proximity to a device that is operative to transfer power and communicate wirelessly is in fact a device that is suitable for receiving power and/or communication wirelessly. For example, based on monitoring and tracking of one or more electrical characteristics of a drive signal provided to the first coil within such a device that is operative to transfer power and communicate wirelessly, one or more processing modules is operative to make a determination whether or not there is a presence of an actual component that is in fact a device that is suitable for receiving power and/or communication wirelessly. Consider a situation in which the one or more electrical characteristics of the drive signal provided to the first coil are not contained within an acceptable range that is expected when transferring power and/or communicating wirelessly (e.g., such as for a device that is suitable for receiving power and/or communication wirelessly), then the one or more processing modules is operative to make a determination that there is no device that is suitable for receiving power and/or communication wirelessly present. In some examples when such a determination is made, the one or more processing modules operative to execute one or more operations which may include stopping of the charging process (e.g., by adjusting and amplitude of the reference signal to zero to stop the DSC from providing a drive signal in accordance with a charging operation), or other operations.

Various diagrams, embodiments, examples, etc. of a device (e.g., any of devices 1409-1, 1409-1, 1409-2, 1409-3, 1409-4) that is operative to provide power and/or communicate wirelessly in accordance with the manner as described herein may be configured to perform various functions and operations. For example, such a device that includes a DSC, memory that stores operational instructions, and one or more processing modules operably coupled to the DSC and the memory (or alternatively, the one or more processing modules includes the memory) may be configured to perform various functions and operations.

In an example of operation and implementation, the one or more processing modules is configured to process the digital signal representative of the one or more electrical characteristics of the drive signal to determine whether a signal associated with the another device is coupled into the drive signal thereby indicating presence of the another device within the proximity to the device that facilitates electromagnetic coupling between the first coil and the second coil. Based on determination that no signal associated with the another device is coupled into the drive signal, the one or more processing modules is configured to adjust an amplitude of the reference signal to zero to stop the DSC from providing the drive signal to the first coil via the single line and via the resonating capacitor.

In another example of operation and implementation, the one or more processing modules is configured to process the digital signal representative of the one or more electrical characteristics of the drive signal to determine a current profile of the current flowing through the first coil. The one or more processing modules is also configured to determine whether the current profile of the current flowing through the first coil compares favorably with one or more predetermined current profiles associated with wireless power transfer from the device to the another device in accordance with charging of a battery of the another device. Based on determination that the current profile of the current flowing through the first coil compares unfavorably with one or more predetermined current profiles associated with charging of the battery of the another device, the one or more processing modules is configured to adjust an amplitude of the reference signal to zero to stop the DSC from providing the drive signal to the first coil via the single line and via the resonating capacitor.

In yet another example of operation and implementation, the one or more processing modules is configured to process the digital signal representative of the one or more electrical characteristics of the drive signal to determine an impedance profile of the another device associated with the second coil. The one or more processing modules is also configured to determine whether the impedance profile of the another device associated with the second coil compares favorably with a battery impedance profile associated with charging of a battery of the another device. Based on determination that the impedance profile of the another device associated with the second coil compares unfavorably with a battery impedance profile associated with charging of the battery of the another device, the one or more processing modules is configured to adjust an amplitude of the reference signal to zero to stop the DSC from providing the drive signal to the first coil via the single line and via the resonating capacitor.

In an example of operation and implementation, the one or more processing modules is configured to execute the operational instructions to generate the reference signal as a sinusoidal signal. In other examples, the one or more processing modules is configured to execute the operational instructions to adapt an amplitude of the reference signal based on the one or more electrical characteristics of the drive signal to maximize the error signal (e.g., maximize Ve). In additional examples, the one or more processing modules is configured to generate the reference signal to have a frequency that is based on a resonant frequency associated with an inductance of the first coil and a capacitance of the resonating capacitor.

As shown in various diagrams, certain examples of DSCs include a comparator configured to produce the error signal based on comparison of the reference signal to the drive signal, wherein the reference signal is received at a first input of the comparator, and the drive signal is received at a second input of the comparator. Such examples of DSCs also include a dependent current supply configured to generate the drive signal based on the error signal and to provide the drive signal via the single line that couples to the resonating capacitor and the second input of the comparator and an analog to digital converter (ADC) configured to process the error signal to generate the digital signal representative of the one or more electrical characteristics of the drive signal. In certain examples, note also that the one or more processing modules is configured to execute the operational instructions to adjust a programmable gain of the dependent current supply. Note that scaling the programmable gain of the dependent current supply provides for scaling of the error signal.

Note that any type of device operative to receive power and/or communication wirelessly may benefit from and operate in conjunction with a device that is operative to provide power and/or communication wirelessly as described herein. Examples of such a device operative to receive power and/or communication wirelessly may include any one or more of a laptop computer, a cell phone, an electronic pad device, a personal digital assistant, a portable music devices, a portable media players, a tablet, a digital camera, and/or any other type of device.

Figure 23:
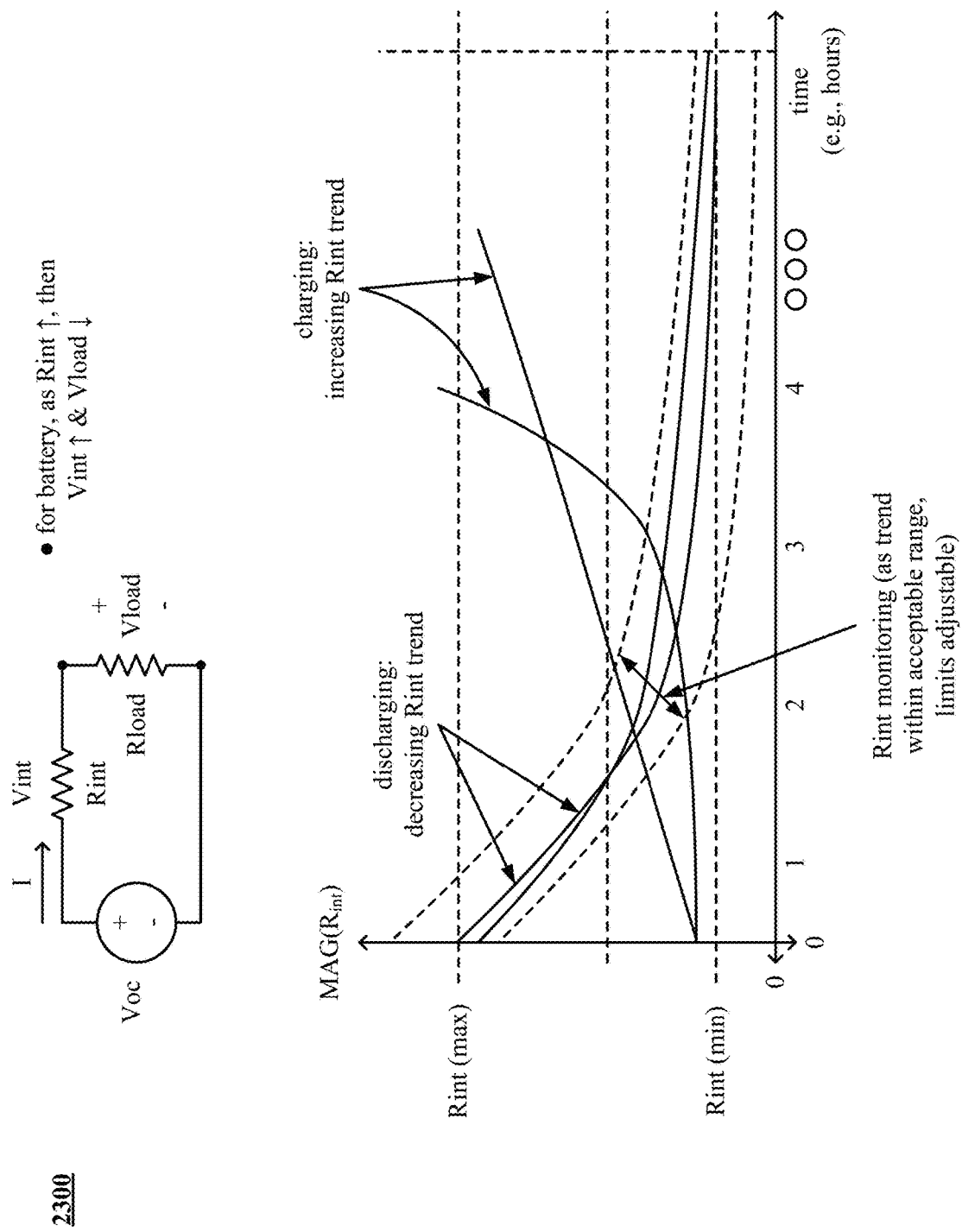
FIG. 23 is a schematic block diagram of an embodiment of a battery impedance profile such as associated with a battery of a device during battery charging in accordance with wireless transfer of power in accordance with the present invention.

FIG. 23 is a schematic block diagram of an embodiment 2300 of a battery impedance profile such as associated with a battery of a device during battery charging in accordance with wireless transfer of power in accordance with the present invention. At the top of the diagram is a basic equivalent circuit associated with a battery. The battery may be modeled to have a voltage source corresponding to an open circuit voltage, Voc, of the battery, an internal resistance, Rint, and a load resistance, Rload (e.g., when the battery is connected to such a load). More complex equivalent circuit models of batteries also exist that characterize internal impedance of the battery as being complex in nature, having not only resistive but capacitive and/or inductive components as well. While this particular example is provided as do the with resistive impedances of an internal resistance, Rint, and a load resistance, Rload, note that an appropriately implemented DSC 28 is fully operative to detect impedance including change of impedance in a component connected thereto being resistive or complex in nature.

As the internal resistance, Rint, of the battery increases, a voltage drop across that internal resistance, Rint, namely, Vint, will increase as well as the battery is attempting to deliver a current, I, to the load resistance, Rload. In accordance with a battery charging process, the internal resistance, Rint, of the battery can change. For example, during a charging operation, there is typically an associated trend of increasing internal resistance, Rint, of the battery during the charging process. Conversely, during a discharging operation, there is typically an associated trend of decreasing internal resistance, Rint, of the battery during the discharging process.

An appropriately implemented DSC 28 is operative to detect impedance including change of impedance in a component connected thereto. For example, an appropriately implemented DSC 28 in communication with a battery is operative to detect the impedance of the battery including change impedance of the battery. Appropriate monitoring of a battery using such a DSC 28 during charging and/or discharging operations facilitates monitoring and tracking of the changing impedance of the battery over time.

Similarly, an appropriately implemented DSC 28 is operative to detect change of current that is drawn by or concerned by a component connected thereto. For example, an appropriately implemented DSC 28 in communication with a battery is operative to detect the current drawn by or consumed by the battery including change thereof during a charging operation and/or the current delivered by the battery including change thereof during a discharging operation. Considering various embodiments, examples, etc. as included herein, a DSC 28 that is providing a drive signal via a resonating capacitor 1402 the first coil is also operative to detect the impedance of those one or more components to which the drive signal is being provided including change thereof.

In some examples, the change of impedance of the battery is within a particular range (e.g., changing within a range between a minimum and maximum of internal resistance, Rint(min) and Rint(max)) during the charging and/or discharging operations.

Generally speaking, a profile of change of impedance of the battery during charging and/or discharging operations can be used for comparison to ensure whether or not the battery is operating within acceptable ranges. For example, a profile of change of impedance of the battery during charging and/or discharging operations may be generated based on monitoring the battery during normal and acceptable charging and/or discharging operations, based on information provided from battery manufacturer specifications, based on information known of batteries of similar type, construction, etc. and/or other means.

In an example of operation and implementation, one or more processing modules is operative to process information provided from an appropriately implemented DSC to monitor whether or not a charging and/or discharging operation is operating in an acceptable manner. For example, based on detection of impedance of that component being outside of an acceptable range of change of impedance of the battery during a charging operation, the one or more processing modules is operative to make a determination that there is an error or problem with the charging operation. The one or more processing modules operative to execute one or more operations which may include stopping of the charging process (e.g., by adjusting and amplitude of the reference signal to zero to stop the DSC from providing a drive signal in accordance with a charging operation), modifying a reference signal thereby modifying the drive signal (e.g., adjusting one or more parameters of the reference signal), or other operations.

In another example, the one or more processing modules is operative to detect the presence or lack of presence of a device that is suitable for receiving power wirelessly. For example, based on detection of change of impedance of a component being outside of an acceptable range of change of impedance of the battery, the one or more processing modules is operative to make a determination that the component is not a device that is suitable for receiving power wirelessly. Consider an example in which a component that is not appropriate for reception of power wirelessly (e.g., perhaps the component is not a device at all that is a candidate for receiving power wirelessly), then based on detection of change of impedance of such a component being outside of an acceptable range of change of impedance of the battery, the one or more processing modules is operative to make a determination that the component is not a device that is suitable for receiving power wirelessly and execute one or more operations.

FIG. 24 is a schematic block diagram of an embodiment 2400 of a battery temperature profile such as associated with a battery of a device during battery charging in accordance with wireless transfer of power in accordance with the present invention. This diagram shows generally various profiles of changing temperature of the battery over time during charging operations. Again, for a particular battery of a certain type, construction, composition, etc., such trends may be made based on actual monitoring and tracking of that particular battery during acceptable or normal operation, from information provided from a manufacturer of that particular battery, from information associated with similar types of batteries, and/or other information.

In this diagram, consider an example of a Lithium-ion battery having an effective operational range between 10–40° C. or 50-104° F., and further consider an acceptable range or change of temperature, such as X° C. or F, where X is some determine the value by which the temperature of the battery changes during charging operations in accordance with acceptable or normal operation. When temperature is monitored as being within such an acceptable range or change of temperature during a charging process, then one or more processing modules is operative to facilitate continuation of the charging process. However, when temperature is monitored as being outside of such an acceptable range or change of temperature during a charging process, then one or more processing modules is operative to execute one or more operations which may include stopping of the charging process.

Consider an example of a device that is operative to transfer power and communicate wirelessly including a temperature sensor in proximity of the first coil thereof, then monitoring temperature at that location may be a basis to determine whether or not a component in proximity thereto is an actual device that is suitable for receiving power and/or communication wirelessly, whether or not operation of charging of a battery of a device that is suitable for receiving power and/or communication wirelessly is operating within a normal or acceptable range, etc.

In an example of operation and implementation, one or more processing modules is operative to process information provided from an appropriately implemented DSC to monitor whether or not a charging and/or discharging operation is operating in an acceptable manner. For example, based on detection of temperature of that component being outside of an acceptable range of change of temperature of the battery during a charging operation, the one or more processing modules is operative to make a determination that there is an error or problem with the charging operation. The one or more processing modules operative to execute one or more operations which may include stopping of the charging process (e.g., by adjusting and amplitude of the reference signal to zero to stop the DSC from providing a drive signal in accordance with a charging operation), modifying a reference signal thereby modifying the drive signal (e.g., adjusting one or more parameters of the reference signal), or other operations.

In another example, the one or more processing modules is operative to detect the presence or lack of presence of a device that is suitable for receiving power wirelessly. For example, based on detection of change of temperature of a component being outside of an acceptable range of change of temperature of the battery, the one or more processing modules is operative to make a determination that the component is not a device that is suitable for receiving power wirelessly. Consider an example in which a component that is not appropriate for reception of power wirelessly (e.g., perhaps the component is not a device at all that is a candidate for receiving power wirelessly), then based on detection of change of temperature of such a component being outside of an acceptable range of change of temperature of the battery, the one or more processing modules is operative to make a determination that the component is not a device that is suitable for receiving power wirelessly and execute one or more operations.

FIG. 25 is a schematic block diagram of another embodiment 2500 of various devices including a device that is operative to transfer power and communicate wirelessly in accordance with the present invention. This diagram has some similarities to certain of the prior diagrams will with at least some differences being that DSC 28-25 includes a power amplifier 2510 that is implemented in conjunction with the voltage divider 2522 replace the dependent current source included in certain of the other diagrams. In some embodiments, note that the one or more processing modules 42 is implemented to direct operation of one or both of the power amplifier 2510 and the voltage divider 2520. For example, the one or more processing modules 42 is operative to adjust the voltage division being performed by the voltage divider 2520 (e.g., by selecting different respective impedances as may be included within a voltage divider including multiple selective voltage division paths, adjusting one or more variable impedances that may be included within such a voltage divider, etc.).

In addition, note that the operation of the power amplifier 2510 may be adapted by the one or more processing modules 42 as well. For example, consider a gain factor as may be included within the power amplifier 2510, such as if the power amplifier 2510 is incremented as a programmable amplifier (PGA), then the one or more processing modules 42 is configured to adjust the programmability/gain factor of the power amplifier 2510 as desired. Generally speaking, the one or more processing modules 42 is operative to adjust operation, configuration, etc. of the power amplifier 2510 and/or voltage divider 2520 based on and in accordance with any of the means described herein by which information is determined, received, etc. by the one or more processing modules 42 (e.g., based on the sensing of the drive signal from the DSC 28-17, based on communication from device 1410-3, etc.).

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A device that is operative to transfer power and communicate wirelessly, the device comprising:
    a first coil;
    a drive-sense circuit (DSC) operably coupled to generate a drive signal based on a reference signal, wherein, when enabled, the DSC operably coupled and configured to:
        provide the drive signal to the first coil via a single line and via a resonating capacitor and simultaneously to sense the drive signal via the single line, wherein, based on the first coil being in a proximity to a second coil associated with another device that facilitates electromagnetic coupling between the first coil and the second coil, the drive signal is operative to transfer power wirelessly from the first coil to the second coil, wherein sensing of the drive signal via the single line includes detection of one or more electrical characteristics of the drive signal including detection of whether a communication signal is transmitted from the another device to the device via the electromagnetic coupling between the first coil and the second coil; and
        generate a digital signal representative of the one or more electrical characteristics of the drive signal based on an error signal corresponding to a difference between the drive signal and the reference signal; and
    memory that stores operational instructions; and
    one or more processing modules operably coupled to the DSC and the memory, wherein, when enabled, the one or more processing modules is configured to execute the operational instructions to:
        process the digital signal representative of the one or more electrical characteristics of the drive signal to determine the one or more electrical characteristics of the drive signal including to determine whether the communication signal is transmitted from the another device to the device via the electromagnetic coupling between the first coil and the second coil.

2. The device of claim 1, wherein the another device includes a wireless transceiver configured to receive power wirelessly via the second coil and to facilitate communication with the device.

3. The device of claim 1, wherein, when enabled, the one or more processing modules is further configured to execute the operational instructions to:
    generate the reference signal and provide the reference signal to the DSC; and
    based on determination that the communication signal is transmitted from the another device to the device:
        process the digital signal to interpret control information from the communication signal; and
        adapt at least one parameter of the reference signal based on the control information, wherein the at least one parameter of the reference signal includes a magnitude, a frequency, a signal type, a waveform type, or a phase.

4. The device of claim 1, wherein, when enabled, the one or more processing modules is further configured to execute the operational instructions to:
    generate the reference signal and provide the reference signal to the DSC; and
    based on determination that no communication signal is transmitted from the another device to the device, adjust an amplitude of the reference signal to zero to stop the DSC from providing the drive signal to the first coil via the single line and via the resonating capacitor.

5. The device of claim 1, wherein, when enabled, the one or more processing modules is further configured to execute the operational instructions to:
    generate the reference signal and provide the reference signal to the DSC; and
    based on determination that the communication signal is transmitted from the another device to the device, continue to provide the reference signal to the DSC to facilitate wireless power transfer from the first coil to the second coil in accordance with charging of a battery of the another device, wherein the communication signal includes information indicating presence of the another device within the proximity to the device that facilitates electromagnetic coupling between the first coil and the second coil.

6. The device of claim 1, wherein, when enabled, the one or more processing modules is further configured to execute the operational instructions to:
    generate the reference signal and provide the reference signal to the DSC;
    process the digital signal representative of the one or more electrical characteristics of the drive signal to determine the one or more electrical characteristics of the drive signal including to determine whether another communication signal is transmitted from the another device to the device via the electromagnetic coupling between the first coil and the second coil; and
    based on determination that the another communication signal is transmitted from the another device to the device:
        process the digital signal to interpret additional control information from the another communication signal; and
        based on determination that the additional control information indicates a charged status of a battery of the another device, adjust an amplitude of the reference signal to zero to stop the DSC from providing the drive signal to the first coil via the single line and via the resonating capacitor.

7. The device of claim 1, wherein, when enabled, the one or more processing modules is further configured to execute the operational instructions to:
    generate the reference signal to have a frequency that is based on a resonant frequency associated with an inductance of the first coil and a capacitance of the resonating capacitor; and
    provide the reference signal to the DSC.

8. The device of claim 1, wherein the DSC further comprises:
    a comparator configured to produce the error signal based on comparison of the reference signal to the drive signal, wherein the reference signal is received at a first input of the comparator, and the drive signal is received at a second input of the comparator;

a dependent current supply configured to generate the drive signal based on the error signal and to provide the drive signal via the single line that couples to the resonating capacitor and the second input of the comparator; and an analog to digital converter (ADC) configured to process the error signal to generate the digital signal representative of the one or more electrical characteristics of the drive signal.

9. The device of claim 8, wherein, when enabled, the one or more processing modules is further configured to execute the operational instructions to:

adjust a programmable gain of the dependent current supply, wherein scaling the programmable gain of the dependent current supply provides for scaling of the error signal.

10. The device of claim 1, wherein the reference signal is a sinusoidal signal.

11. The device of claim 1, wherein the another device includes a laptop computer, a cell phone, an electronic pad device, a personal digital assistant, a portable music devices, a portable media players, a tablet, or a digital camera.

12. A device that is operative to transfer power and communicate wirelessly, the device comprising:

a first coil;

a drive-sense circuit (DSC) operably coupled to generate a drive signal based on a reference signal that is a sinusoidal signal, wherein, when enabled, the DSC operably coupled and configured to:

provide the drive signal to the first coil via a single line and via a resonating capacitor and simultaneously to sense the drive signal via the single line, wherein, based on the first coil being in a proximity to a second coil associated with another device that facilitates electromagnetic coupling between the first coil and the second coil, the drive signal is operative to transfer power wirelessly from the first coil to the second coil, wherein sensing of the drive signal via the single line includes detection of one or more electrical characteristics of the drive signal including detection of whether a communication signal is transmitted from the another device to the device via the electromagnetic coupling between the first coil and the second coil, wherein the communication signal includes information indicating presence of the another device within the proximity to the device that facilitates electromagnetic coupling between the first coil and the second coil; and generate a digital signal representative of the one or more electrical characteristics of the drive signal based on an error signal corresponding to a difference between the drive signal and the reference signal; and memory that stores operational instructions; and one or more processing modules operably coupled to the DSC and the memory, wherein, when enabled, the one or more processing modules is configured to execute the operational instructions to:

process the digital signal representative of the one or more electrical characteristics of the drive signal to determine the one or more electrical characteristics of the drive signal including to determine whether the communication signal is transmitted from the another device to the device via the electromagnetic coupling between the first coil and the second coil.

13. The device of claim 12, wherein the another device includes a wireless transceiver configured to receive power wirelessly via the second coil and to facilitate communication with the device.

14. The device of claim 12, wherein, when enabled, the one or more processing modules is further configured to execute the operational instructions to:

generate the reference signal and provide the reference signal to the DSC; and based on determination that the communication signal is transmitted from the another device to the device:

process the digital signal to interpret control information from the communication signal; and adapt at least one parameter of the reference signal based on the control information, wherein the at least one parameter of the reference signal includes a magnitude, a frequency, a signal type, a waveform type, or a phase.

15. The device of claim 12, wherein, when enabled, the one or more processing modules further configured to execute the operational instructions to:

generate the reference signal and provide the reference signal to the DSC; and based on determination that no communication signal is transmitted from the another device to the device, adjust an amplitude of the reference signal to zero to stop the DSC from providing the drive signal to the first coil via the single line and via the resonating capacitor.

16. The device of claim 12, wherein, when enabled, the one or more processing modules further configured to execute the operational instructions to:

generate the reference signal and provide the reference signal to the DSC; and based on determination that the communication signal is transmitted from the another device to the device, continue to provide the reference signal to the DSC to facilitate wireless power transfer from the first coil to the second coil in accordance with charging of a battery of the another device, wherein the communication signal includes information indicating presence of the another device within the proximity to the device that facilitates electromagnetic coupling between the first coil and the second coil.

17. The device of claim 12, wherein, when enabled, the one or more processing modules further configured to execute the operational instructions to:

generate the reference signal to have a frequency that is based on a resonant frequency associated with an inductance of the first coil and a capacitance of the resonating capacitor; and provide the reference signal to the DSC.

18. The device of claim 12, wherein the DSC further comprises:

a comparator configured to produce the error signal based on comparison of the reference signal to the drive signal, wherein the reference signal is received at a first input of the comparator, and the drive signal is received at a second input of the comparator;

a dependent current supply configured to generate the drive signal based on the error signal and to provide the drive signal via the single line that couples to the resonating capacitor and the second input of the comparator; and an analog to digital converter (ADC) configured to process the error signal to generate the digital signal representative of the one or more electrical characteristics of the drive signal.

19. The device of claim 18, wherein, when enabled, the one or more processing modules is configured to execute the operational instructions to:

adjust a programmable gain of the dependent current supply, wherein scaling the programmable gain of the dependent current supply provides for scaling of the error signal.

20. The device of claim 12, wherein the another device includes a laptop computer, a cell phone, an electronic pad device, a personal digital assistant, a portable music devices, a portable media players, a tablet, or a digital camera.

* * * * *